(12) United States Patent
Hayashi et al.

(10) Patent No.: US 8,118,131 B2
(45) Date of Patent: Feb. 21, 2012

(54) AIR BAG SYSTEM

(75) Inventors: Takeki Hayashi, Aichi-ken (JP); Shigeyuki Suzuki, Aichi-ken (JP); Michio Inoue, Aichi-ken (JP)

(73) Assignee: Toyoda Gosei Co., Ltd, Aichi-pref. (JP)

( * ) Notice: Subject to any disclaimer, the term of this patent is extended or adjusted under 35 U.S.C. 154(b) by 161 days.

(21) Appl. No.: 12/659,093

(22) Filed: Feb. 25, 2010

(65) Prior Publication Data
US 2010/0252350 A1 Oct. 7, 2010

(30) Foreign Application Priority Data

Apr. 1, 2009 (JP) .................. 2009-089504
Sep. 30, 2009 (JP) .................. 2009-227274

(51) Int. Cl.
*B60R 21/36* (2011.01)
(52) U.S. Cl. ........................................ 180/274
(58) Field of Classification Search .......... 180/271, 180/274
See application file for complete search history.

(56) References Cited

U.S. PATENT DOCUMENTS

| | | | | |
|---|---|---|---|---|
| 5,477,390 | A * | 12/1995 | Boddy et al. ............ | 359/841 |
| 6,182,782 | B1 * | 2/2001 | Matsuura et al. ......... | 180/274 |
| 6,467,563 | B1 * | 10/2002 | Ryan et al. ............. | 180/274 |
| 6,497,302 | B2 * | 12/2002 | Ryan .................... | 180/274 |
| 6,883,631 | B2 * | 4/2005 | Hu et al. ............... | 180/274 |
| 6,955,238 | B2 * | 10/2005 | Takimoto ............... | 180/274 |
| 7,726,433 | B2 * | 6/2010 | Satou et al. ........... | 180/274 |

FOREIGN PATENT DOCUMENTS

JP A-2009-6957 1/2009

OTHER PUBLICATIONS

U.S. Appl. No. 12/654,086, filed Dec. 10, 2009, Inoue, et al.

* cited by examiner

*Primary Examiner* — Paul N Dickson
*Assistant Examiner* — Barry Gooden, Jr.
(74) *Attorney, Agent, or Firm* — Posz Law Group, PLC

(57) ABSTRACT

An air bag system M1 is installed in a vehicle having front side doors 13 which are installed adjacent to the rear of front pillars 1 and which each have an outside rearview mirror 27. An air bag 42 includes a pillar covering portion 47 which is disposed to cover a front surface 1a of the front pillar 1 when it completes its inflation and a fitting cell portion 50 which is installed below the pillar covering portion 47 and which is disposed so that when it completes its inflation, a rear end side portion thereof fits in a space defined between the outside rearview mirror 27 and a lateral side of the vehicle on an upper surface side of the outside rearview mirror. The fitting cell portion 50 is connected to a lower edge side of the pillar covering portion 47 over substantially the whole area in a front-rear direction thereof.

8 Claims, 24 Drawing Sheets

A.

B.

AIR BAG SYSTEM

BACKGROUND OF THE INVENTION

1. Field of the Invention

The present invention relates to an air bag system including an air bag that can cover a front surface side of an area of a front pillar of a vehicle that extends from a proximal portion at a lower end side towards a distal end of the front pillar.

2. Background of the Invention

Conventionally, there have been air bag systems in which an air bag is inflated so as to cover a front surface side of a front pillar of a vehicle in order to prevent a pedestrian from being brought into direct forcible collision with the front pillar when the vehicle hits the pedestrian (for example, refer to Patent Document 1).

In this conventional air bag system, the air bag is folded to be stored in an area on a front side of an outside rearview mirror installed on a front side door of the vehicle and is designed to cover a front surface side of an area of the front pillar which extends from a proximal portion at a lower end side which lies in proximity to the outside rearview mirror towards a distal end of the front pillar when the air bag has completed its inflation. Specifically speaking, in the conventional air bag systems, the air bag has a long pillar covering portion (lower end) which covers the front surface side of an area of the front pillar which extends from the proximal portion (lower end) to a position lying in proximity to a vertical center of the front pillar and a inflatable supporting portion which is disposed to project from a position lying in proximity to a vertical center of the pillar covering portion and is interposed between the pillar covering portion and the outside rearview mirror to thereby be supported on the outside rearview mirror. The pillar covering portion is allowed to be supported by the inflatable supporting portion which is supported on an inner surface of the outside rearview mirror, whereby a lateral shift of the pillar covering portion towards a vehicle's outer side is prevented when receiving the pedestrian at the time the air bag has completed its inflation.

Patent Document 1: JP-A-2009-6957

In the air bag of the conventional air bag system, however, the inflatable supporting portion is made to project partially from the position lying in proximity to the vertical center of the pillar covering portion towards the outside rearview mirror side and is supported the inner surface of the outside rearview mirror. Therefore, the shifting of the pillar covering portion occurring at the time of completion of the air bag's inflation can be suppressed. However, when the pedestrian pushes strongly the pillar covering portion towards the vehicle's outer side, the inflatable supporting portion is dislocated from the inner surface of the outside rearview mirror, leading to a fear that the inflatable supporting portion slides over an upper surface of the outside rearview mirror. Thus, there has still been room for improving in suppressing properly the lateral deflection of the pillar covering portion from the front pillar.

SUMMARY OF THE INVENTION

The invention has been made with a view to solving the problem described above, and an object thereof is to provide an air bag system in which a lateral deflection of an air bag can properly be prevented that would otherwise occur when the air bag receives a pedestrian at the time the air bag has completed its inflation, so as to cover a front surface of a front pillar.

According to an aspect of the invention, there is provided an air bag system comprising an air bag which can cover a front surface side of an area of a front pillar of a vehicle which extends from a proximal portion at a lower end side towards a distal end of the front pillar, wherein the vehicle comprises a front side door having a side window which is installed adjacent to a rear side of the front pillar so as to be positioned at a rear of the front pillar and an outside rearview mirror which is positioned in proximity to a front lower corner of the side window, wherein the air bag is folded to be stored within a storage portion disposed in proximity to a front side of the outside rearview mirror below the front pillar and is designed to be inflated while projecting outwards from the storage portion by allowing an inflation gas to be introduced into an interior of the air bag, the air bag comprising:

a pillar covering portion disposed so as to cover the front surface of the front pillar when the air bag completes its inflation; and a fitting cell portion which is defined to be separated from the pillar covering portion, which is disposed below the pillar covering portion when the air bag completes its inflation and of which a rear end side portion is fitted into a space defined between a portion of the outside rear view mirror on an upper surface side thereof and a lateral side of the vehicle, and wherein the fitting cell portion is connected to a lower edge side of the pillar covering portion over a substantially whole area thereof along a front-rear direction.

In the air bag system of the invention, since the air bag has the fitting cell portion which is defined to be separated from the pillar covering portion for covering the front surface of the front pillar and of which the rear end side portion is fitted into the space defined between the portion of the outside rear view mirror on the upper surface side thereof and the lateral side of the vehicle below the pillar covering portion when the air bag completes its inflation, this fitting cell portion is pressed against the outside rearview mirror of the lateral side of the vehicle stably on a side in a left-right direction (in a vehicle's inside-outside direction) thereof, whereby the deflection of the pillar covering portion in the left-right direction (the vehicle's inside-outside direction) can be suppressed to an extreme extent. In addition, the fitting cell portion is configured to be connected to the lower edge side of the pillar covering portion over the substantially whole area thereof along the front-rear direction. As a result, in the air bag system of the invention, the pillar covering portion which is covering the front surface of the front pillar is allowed to be supported over the whole area of an upper edge side f the fitting cell portion which is prevented from shifting in the vehicle's inside-outside direction by being fitted in the space defined between the portion of the outside rear view mirror which lies on the upper surface thereof and the lateral side of the vehicle body when the air bag finishes its inflation. Thus, when the pillar covering portion is pushed strongly by a pedestrian when the pillar covering portion receives the pedestrian, the pillar covering portion can be prevented from being shifted laterally towards the vehicle's outer side Consequently, in the air bag system of the invention, the lateral deflection of the pillar covering portion can be suppressed properly which would otherwise occur when the pillar covering portion receives the pedestrian at the time the air bag completes its inflation.

In the air bag system of the invention, the pillar covering portion is positioned further upstream of an inflation gas which flows into the air bag than the fitting cell portion. By dosing so, when the air bag deploys to inflate, firstly, the pillar covering portion deploys to inflate so as to cover the front surface of the front pillar by allowing the inflation gas to flow into an interior thereof. Thereafter, the fitting cell portion inflates by allowing the inflation gas into an interior thereof. Because of this, the front surface of the front pillar can be covered quickly by the inflating pillar covering portion, which is preferable.

In the air bag system that is configured as has been described above, it is preferable to adopt a configuration in which an inlet opening into which an inflation gas is allowed to flow is installed at a front end side of the fitting cell portion, in which an inner tube adapted to guide an inflation gas discharged from an inflator for supplying an inflation gas into the air bag towards the side of the pillar covering portion is disposed in an interior of the air bag, and in which the inner tube has a substantially cylindrical shape and extends across the inlet opening so as to be opened towards the pillar covering portion's side at a distal end side thereof.

In the event that the air bag system adopts the configuration described above, by the substantially cylindrical inner tube being installed in the interior of the air bag not only can the configuration be simplified but also the pillar covering portion can be made to inflate earlier that the fitting cell portion in a stable fashion. In addition, the inflation timings of the pillar covering portion and the fitting cell portion (a flow starting timing of inflation gas into the fitting cell portion) can be made substantially constant, thereby making it possible to suppress the occurrence of variations product by product.

In the air bag system configured as has been described above, it is preferable to adopt a configuration in which a tether is installed on the air bag so as to extend from a circumferential edge of the air bag which completes its inflation to thereby be attached to the side of the storage portion at a distal end thereof, and in which the tether comprises an inner strap portion which extends from an inner edge side of the pillar covering portion when the pillar covering portion completes its inflation which inner edge side constitutes a side lying far from the fitting cell portion to pull the inner edge side of the pillar covering portion towards the side of the storage portion so as to suppress the rising of the pillar covering portion from the front pillar.

In the air bag system configured as described above, the inner edge side of the pillar covering portion which constitutes the side lying far apart from the fitting cell portion can be restrained from rising from the front pillar when the air bag completes its inflation, whereby the front surface side of the front pillar can be covered widely by the pillar covering portion of the air bag when the air bag completes its inflation.

In the air bag system of the invention, a configuration may be adopted in which the fitting cell portion takes a substantially rod-like shape which extends substantially along the front-rear direction when the fitting cell portion completes its inflation and has installed at a front end side thereof an inlet opening which is positioned further upstream than the pillar covering portion and through which an inflation gas is allowed to flow into the fitting cell portion. In the case of the configuration being adopted, the fitting cell portion completes its inflation earlier than the pillar covering portion and is then fitted into the predetermined space, whereby the inflating pillar covering portion is restrained from deploying in such a way as to be shifted towards the vehicle's outer side, so as to be disposed to cover the front surface side of the front pillar in an accurate fashion. In addition, since the fitting cell portion takes the substantially rod-like shape which extends substantially along the front-rear direction when the fitting cell portion completes its inflation, the fitting cell portion can support the side of the pillar covering portion which faces the vehicle's outer side over the whole area thereof in the front-rear direction, thereby making it possible to prevent the pillar covering portion from being shifted largely laterally towards the vehicle's outer side in a more accurate fashion. Because of this, should a pedestrian be brought into forcible contact with the pillar covering portion before the pillar covering portion completes its inflation, the positional shifting of the pillar covering portion can be suppressed to an extreme extent, thereby making it possible to protect the pedestrian by part of the pillar covering portion in a smooth fashion.

In the air bag system configured as described above, in the event that a configuration is adopted in which the fitting cell portion is separated from the pillar covering portion with a rear end side closed relative to the pillar covering portion, a rear end side portion of the fitting cell portion which is to be fitted in the space defined between the outside rearview mirror and the lateral side of the vehicle is fitted in that space in such a state that of flows of inflation gas between those two air bag portions, a flow of inflation gas to the pillar covering portion is suppressed to an extreme extent. Therefore, the condition in which the fitting cell portion is fitted in the space is easy to be held, and the fitting cell portion can support the pillar covering portion in such a state that a high internal pressure is maintained. Because of this, even in the event that the pillar covering portion which receives a pedestrian is pressed strongly by the pedestrian, the fitting cell portion receives the pressing force so as to preferably prevent the pillar covering portion from being shifted laterally towards the vehicle's outer side in an accurate fashion.

In contrast, in the air bag system configured as described above, a configuration may be adopted in which a communicating portion which is caused to communicate with the pillar covering portion is disposed in proximity to a rear end of the fitting cell portion. In the case of the configuration being adopted, a two-way flow of inflation gas is enabled between the fitting cell portion and the pillar covering portion via the communicating portion. Therefore, an excessive amount of inflation gas is allowed to escape into the fitting cell portion when the pillar covering portion receives a pedestrian, whereby the pedestrian can softly be received by the pillar covering portion.

In the air bag system configured as described above, a configuration is preferably adopted in which the air bag comprises an inflatable covering portion having the pillar covering portion and the fitting cell portion which are installed therein and disposed so as to cover an area extending from an area at the front side of the outside rearview mirror below the front pillar to the front surface of the front pillar when the inflatable covering portion completes its inflation and an inflatable supporting portion disposed in the area at the front of the outside rearview mirror and disposed so as to be supported on a lower surface side thereof by a vehicle body side member positioned below the storage portion on a lower surface side of the inflatable covering portion to support the lower surface side of the inflatable covering portion when the inflatable covering portion completes its inflation.

In the air bag system configured as described above, when the air bag completes its inflation, the whole of the air bag is supported on the lower surface thereof by the inflatable covering portion which is supported by the vehicle body side member positioned below the storage portion, and any descending movement of the fitting cell portion itself is prevented, whereby the lateral shift of the pillar covering portion towards the vehicle's outer side can be prevented more accurately.

DESCRIPTION OF THE PREFERRED EMBODIMENTS

Figure 1:
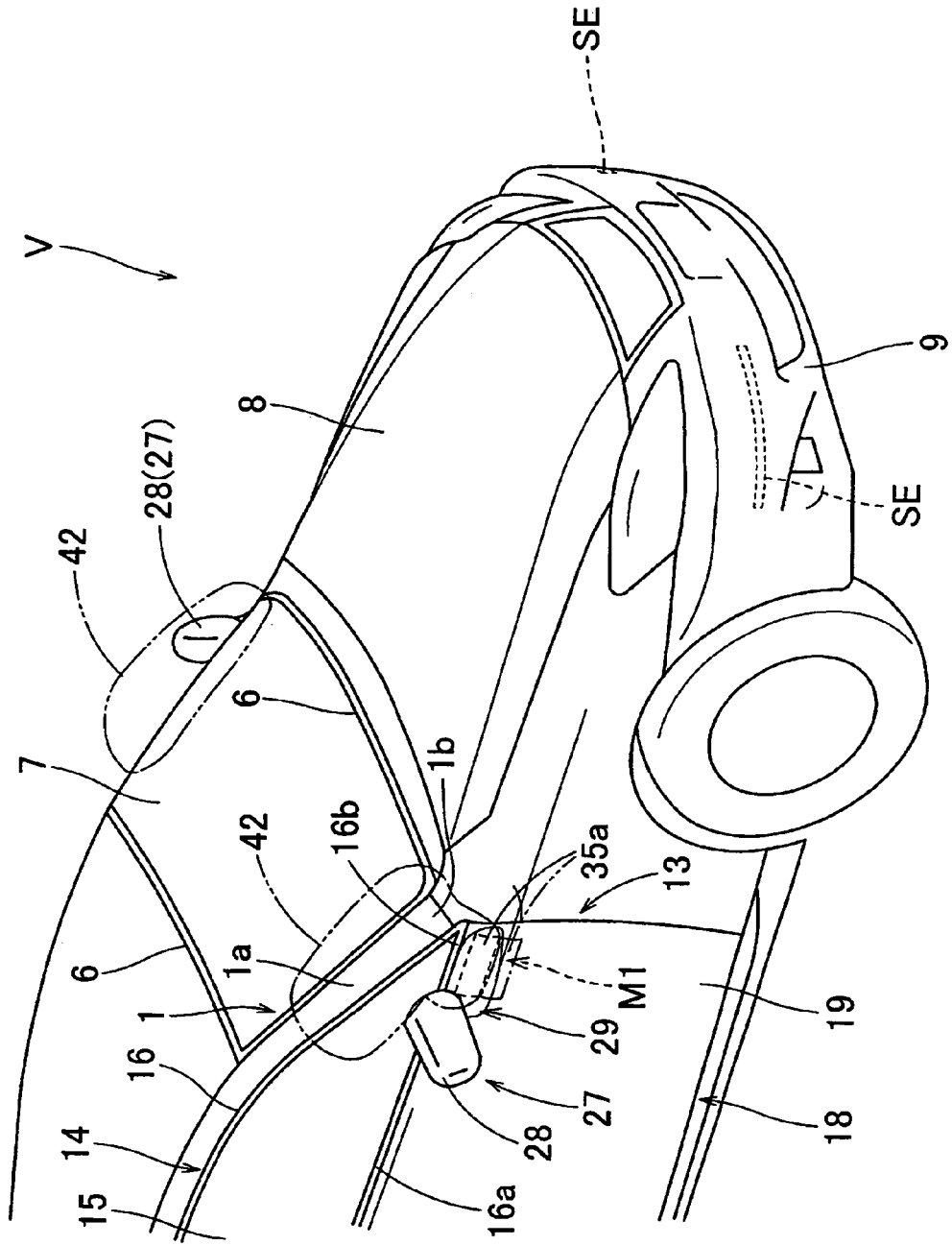
FIG. 1 is a partially enlarged perspective view of a vehicle in which an air bag system constituting a first embodiment of the invention is installed.
Figure 2:
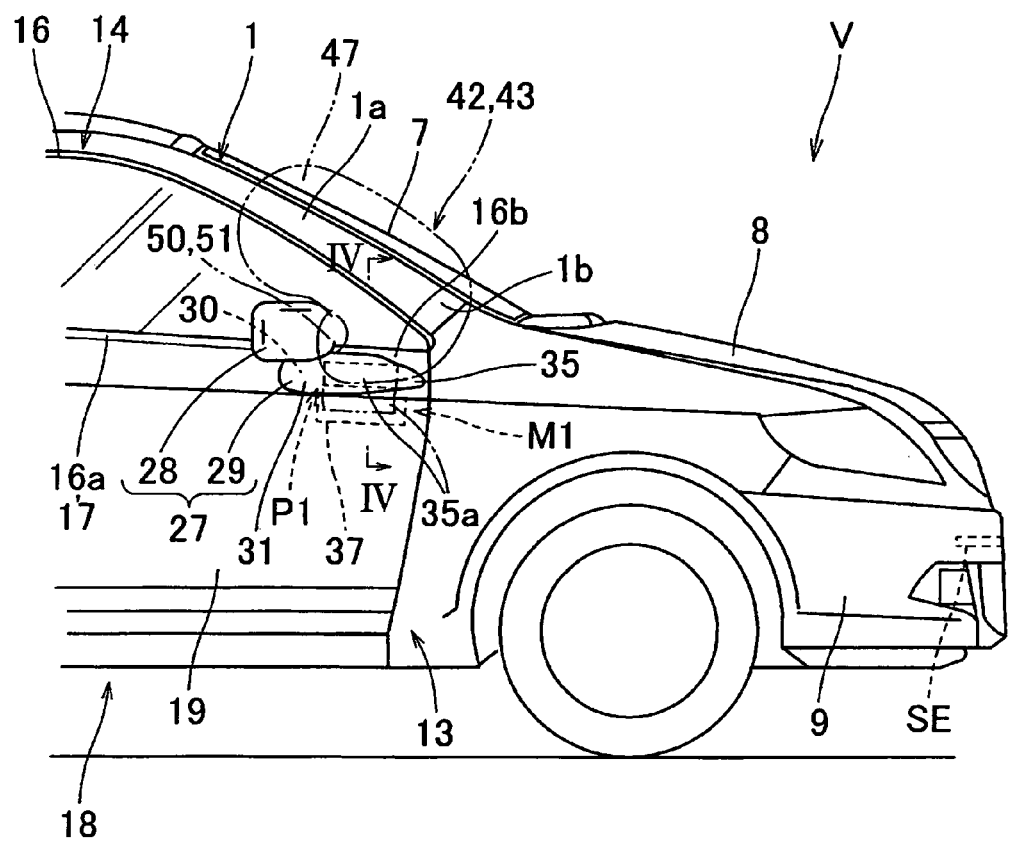
FIG. 2 is a partially enlarged side view of the vehicle in which the air bag system of the first embodiment is installed.
Figure 3:
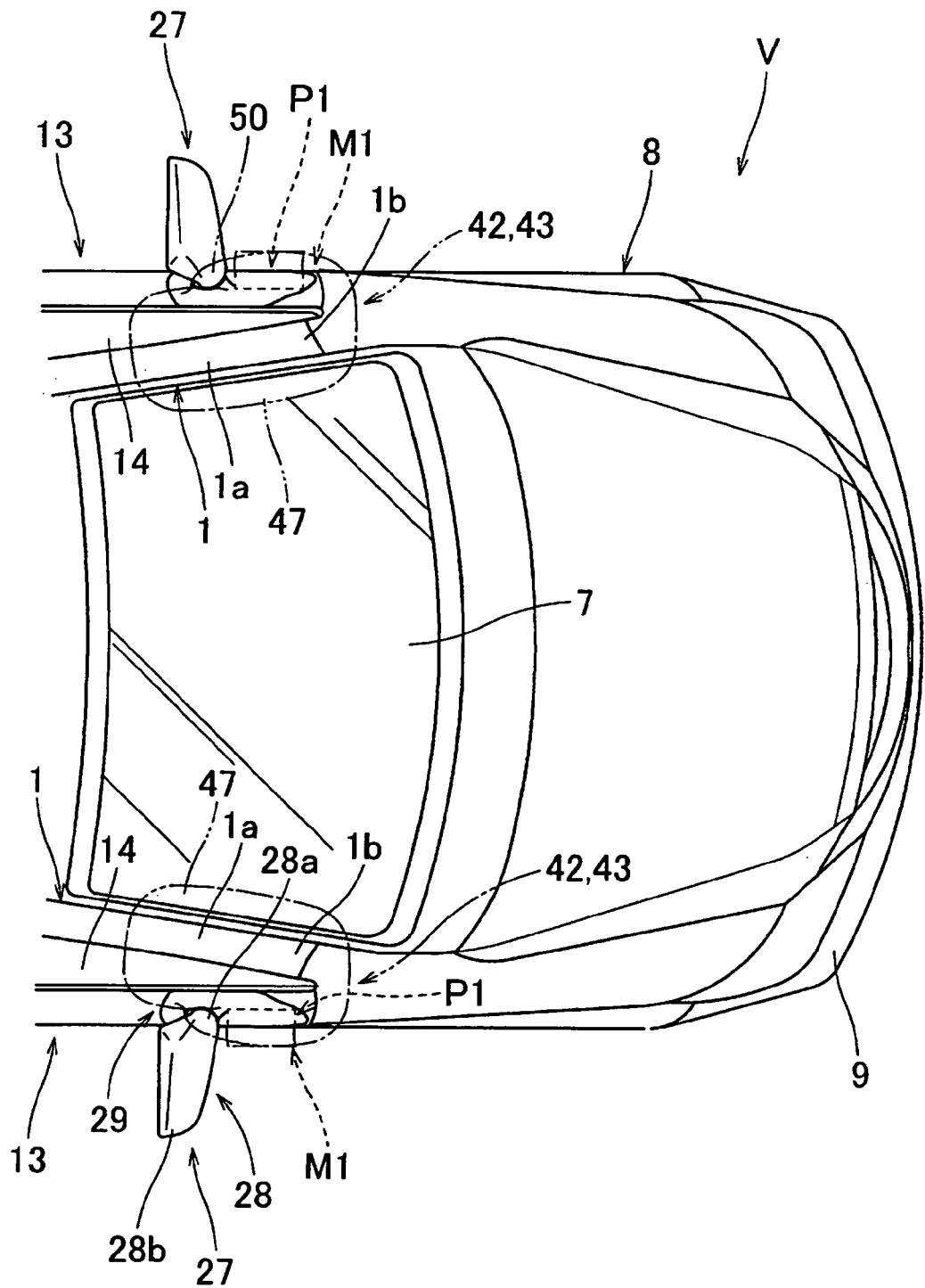
FIG. 3 is a partially enlarged plan view of the vehicle in which the air bag system of the first embodiment is installed.

Hereinafter, an embodiment of the invention will be described based on the drawings. As is shown in FIGS. 1 to 3, an air bag system M1 of a first embodiment is installed in each of front side doors 13 which are installed adjacent to a rear side of left and right front pillars 1 of a vehicle V. Specifically, the air bag system M1 is installed in a location where an outside rearview mirror 27 is provided on the front side door 13. Each of the left and right front pillars 1 includes an outer panel 2, an inner panel 3, and a reinforcement 4 which is disposed between the outer panel 2 and the inner panel 3 and these panels 2, 3 and the reinforcement 4 are made of sheet steel or the like. Thus, the front pillars 1 are disposed as highly rigid structural members of the vehicle V (refer to FIG. 11). A member denoted by reference numeral 6 in FIG. 1 is a window frame rubber, and a member denoted by reference numeral 7 in FIGS. 1 to 3 is a windshield. In addition, a member denoted by reference numeral 8 in FIGS. 1 to 3 is a hood panel, and a member denoted by 9 in FIGS. 1 to 3 is a front bumper.

In this specification, unless otherwise described, front-rear, vertical and left-right directions are understood to correspond, respectively, to front-rear, vertical and left-right directions of the vehicle.

In this embodiment, the air bag system M1 will be described in detail which includes an air bag 42 adapted to cover a front surface 1a side of the right front pillar 1 of the vehicle V. The air bag system including an air bag adapted to cover a front surface side of the left front pillar of the vehicle has an axisymmetric shape with the air bag system on the right-hand side of the vehicle and is configured identically therewith. Thus, the description of the air bag system on the left-hand side will be omitted here.

Figure 4:
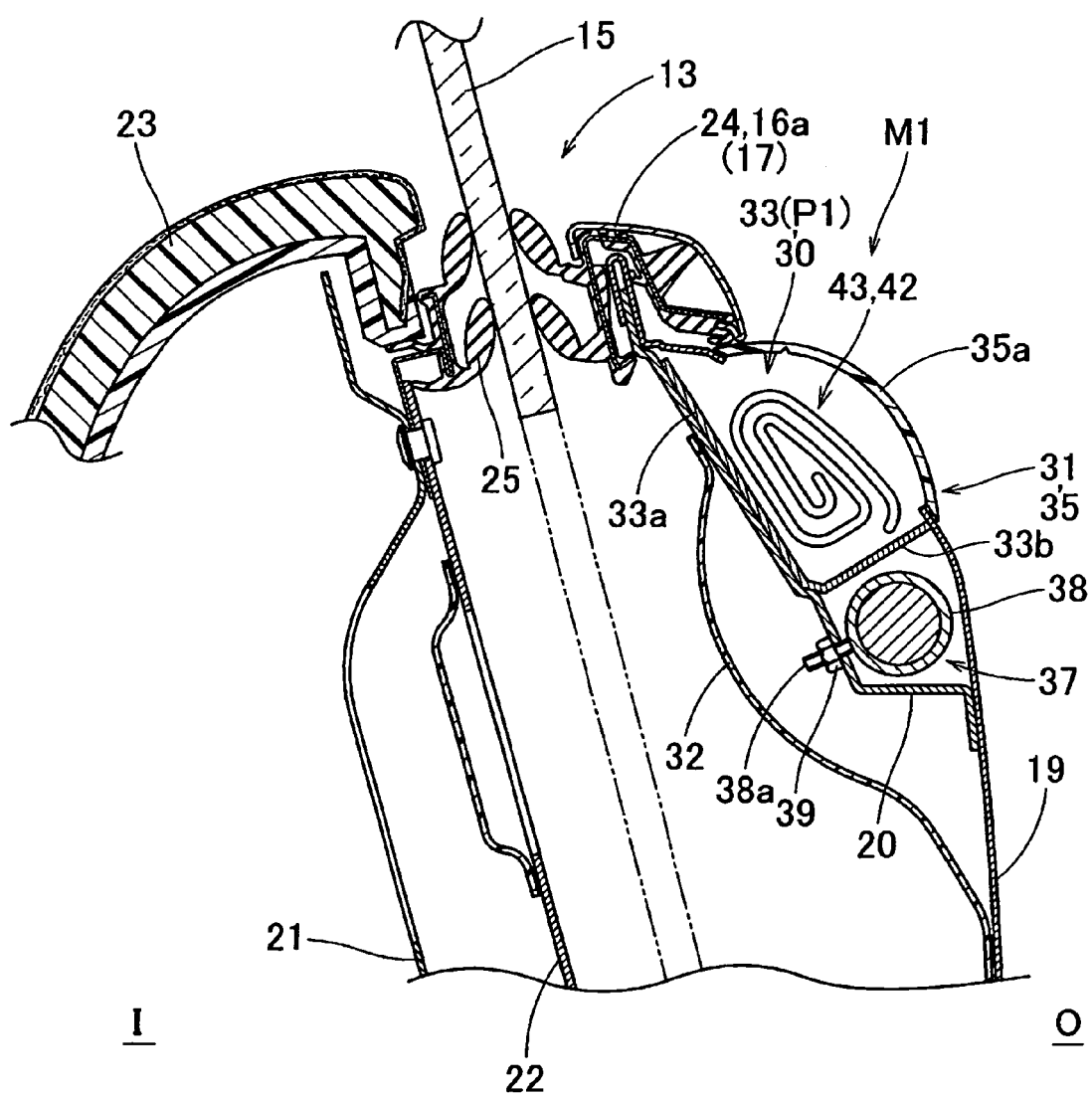
FIG. 4 is a schematic vertical sectional view showing a state in which the air bag system of the first embodiment is installed, the view showing a portion taken along the line IV-IV in FIG. 2.

The front side door 13 in which the air bag system M1 of the first embodiment is, as is shown in FIGS. 1 to 3, installed is such as to be installed adjacent to the rear side of the front pillar 1 and has a side window 14 which is positioned at the rear of the front pillar 1 and a door portion 18 which lies below the side window 14. In addition, the outside rearview mirror 27 is installed in proximity to a front lower corner of the side window 14. The side window 14 includes a door glass 15 and a sash or window frame portion 16 that is disposed around the periphery of the door glass 15. In the case of this embodiment, a lower edge portion 16a of the window frame portion 16 is configured as a belt line 17 (refer to FIG. 2). As is shown in FIG. 4, the door portion 18 includes an outer panel 19 and an inner panel 21 which are made of sheet steel and are disposed so as to have a space therebetween which can accommodate the door glass 15 and a door trim 23 which is disposed so as to cover a side facing a vehicle's inner side I or an inner side of the inner panel 21. In addition, an outer reinforcement 20 and an inner reinforcement 22 are installed on inner sides (sides facing the door glass 15) of the outer panel 19 and the inner panel 21, respectively. An outer molding 24 that constitutes the window frame portion 16 is installed on an upper end side of the outer panel 19, and glass weatherstrips 25 for allowing the door glass 15 to slide therealong are installed at upper end sides of the outer panel 19 and the inner panel 21. In this embodiment, a seal member 32 for preventing infiltration of rain water and foreign matters to the air bag system M1 side is installed on a side facing the vehicle's inner side I or an inner side of an area of the outer reinforcement 20 where the air bag system M1 is disposed (refer to FIG. 4).

Figure 13:
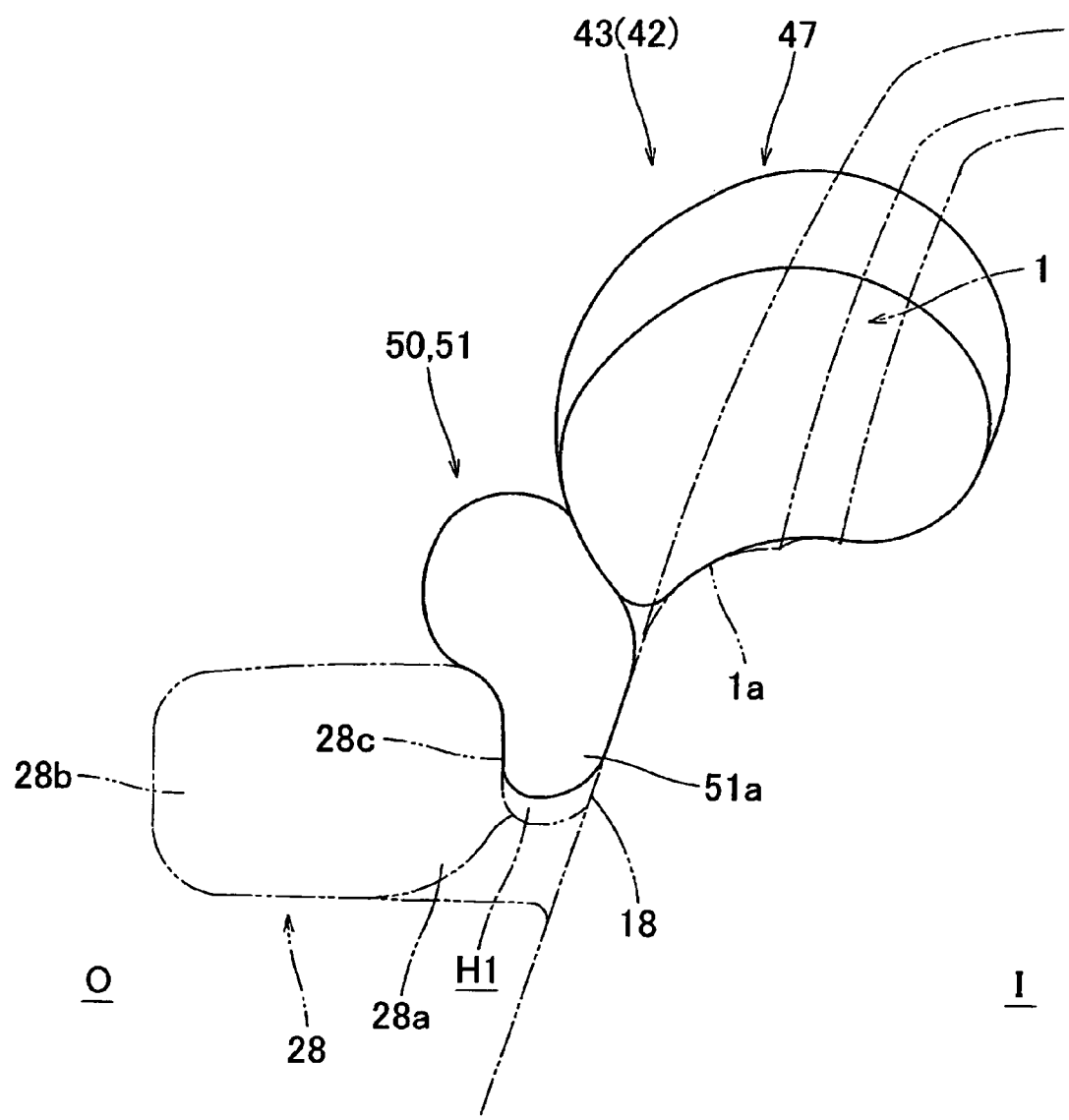
FIG. 13 is a schematic view showing a state in which the fitting cell portion is fitted in a space between an outside rearview mirror and a front side window when the air bag system of the first embodiment is activated.

The outside rearview mirror 27 includes, as shown in FIGS. 1 to 3, a mounting base 29 which is mounted in proximity to a front edge 16b of the lower edge portion 16a (the belt line 17) of the window frame portion 16 and a mirror main body 28 which is mounted rotatably on an upper surface side of the mounting base 29. Specifically, the mounting base 29 is installed in close proximity to a lower side of a proximal portion 1b of the front pillar 1 which constitutes a lower end side thereof (refer to FIGS. 1 to 3). In the case of this embodiment, the mirror main body 28 is installed at a rear end side of the mounting base 29, and the air bag system M1 is installed in an area of the mounting base 29 which lies at a front end side of the portion where the mirror main body 28 is mounted. As is shown in FIGS. 3, 13, when the outside rearview mirror 27 is used, the mirror main body 28 is disposed so that a distal end 28b which extends from a proximal portion 28a where the mirror main body 28 is supported rotatably is caused to project towards a vehicle's outer side O. In such a used state, a substantially triangular space H1, which is made wider on an upper side thereof as viewed from the front, comes to be defined between an end face facing the vehicle's inner side I of the mirror main body 28 (a left end face 28c in the case of this embodiment) and the side window 14 (refer to FIG. 13). The mounting base 29 includes a mounting member 30 made of sheet metal which is disposed on a side facing the vehicle's inner side I (a left-hand side) and which is mounted on the outer reinforcement 20 and a cover member 31 made of a synthetic resin which is disposed so as to cover a side facing the vehicle's outer side (a right-hand side) of the mounting member 30. In the air bag system M1, an area surrounded by the mounting member 30 and the cover member 31 is configured as a storage portion P1 where an air bag 42, which is folded, is stored (refer to FIG. 4). Specifically, the mounting member 30 is configured as a case portion 33 for storing the air bag 42 so folded, and the cover member 31 is configured as an air bag cover 35 that covers the folded air bag 42.

As is shown in FIG. 4, the air bag system M1 includes the air bag 42 which has flexibility and which is formed into a bag shape and an inflator 37 for supplying an inflation gas into the air bag 42. In the air bag system M1 of the first embodiment, only the folded air bag 42 is stored within the storage portion P1, and the inflator 37 is, as shown in FIGS. 2, 4, disposed in an area lying below the storage portion P1. The storage portion P1 where to store the folded air bag 42 is made up of an area at a front side of the mounting base 29 which lies in proximity to a front end of the outside rearview mirror 29. In addition, the mounting member 30 is configured as a case portion 33 for storing the folded air bag 42 in the area at the front side of the mounting base 29, and the cover member 31 which covers the mounting member 30 is configured as the air bag cover 35 which covers a side facing the vehicle's outer side O of the folded air bag 42 (refer to FIGS. 2, 4).

As is shown in FIGS. 2, 4, the case portion 33 is configured as being continued from the mounting member 30 and has an inner wall portion 33a and a lower wall portion 33b which are adapted to cover a side facing the vehicle's inner side I and a lower side of the folded air bag 42, respectively, to thereby be formed to have a substantially L-shaped cross section, whereby the case portion 33 is opened at a side facing the vehicle's outer side O. In the case of this embodiment, this case portion 33 is mounted on the outer reinforcement 20, which constitutes a vehicle body side member, with a side facing the vehicle's inner side of the inner wall portion 33a secured to the outer reinforcement 20. In addition, mounting holes 33c, 33d where tethers 58, which will be described later, of the air bag 42 are attached are formed a portion in proximity to a front end of the lower wall portion 3b and a portion in proximity to a rear end of the inner wall portion 33a of the case 33 portion, respectively (refer to FIGS. 11, 12). In addition, an opening, not shown, through which a gas inlet port portion 54, which will be described later, of the air bag 42 is inserted is formed in the lower wall portion 33b of the case portion 33.

Figure 11:
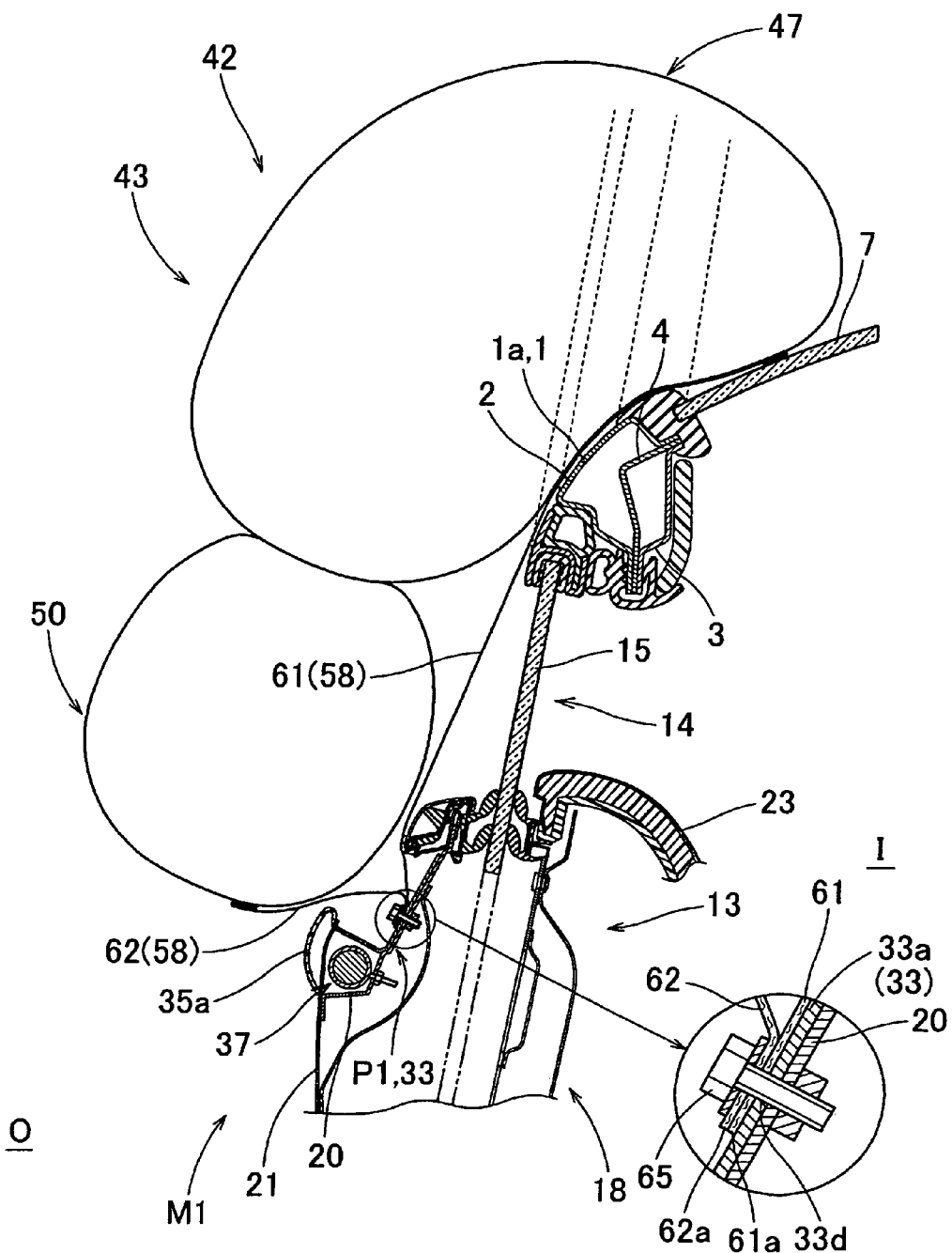
FIG. 11 is a schematic vertical sectional view showing the state in which the air bag completes its inflation when the air bag system of the first embodiment is activated.

The air bag cover 35 is configured as being stretched continuously from the cover member 31 so as to cover a side facing the vehicle's outer side O of the folded air bag 42 and has a door portion 35a which is opened to allow the air bag 42 to project from the case portion 33 when the air bag 42 deploys to inflate. In the case of the embodiment, when it is opened, as is shown in FIG. 11, the door portion 35a rotates about a lower end side thereof as a rotating center to open downwards with an upper end made to open towards the vehicle's outer side and then downwards.

In the case of this embodiment, as is shown in FIGS. 2, 4, the inflator 37 is disposed in an area below the lower wall portion 33b of the case portion 33 which lies below the storage portion P1. In the case of this embodiment, the inflator 37 takes the form of a cylinder whose axial direction extends substantially along a front-rear direction. The inflator 37 includes a gas discharge port, not shown, at a front end side thereof and is connected to the gas inlet port portion 54 of the air bag 42 by making use of a clamp 40 at a portion lying in proximity to the gas discharge port (refer to chain double-dashed lines in FIG. 5). In addition, the inflator 37 is held around the periphery thereof by a diffuser 38 made of sheet metal and is mounted on the outer reinforcement 20, which constitutes the vehicle body side member, by bolts 38a provided on the diffuser 38 being fastened to the outer reinforcement 20 with corresponding nuts 39. Although not shown, the bolts 38a of the inflator 37 are formed at two locations lying thereon along the front-rear direction. An activation signal being inputted thereinto from a predetermined air bag activation circuit, the inflator 37 supplies an inflation gas into the air bag 42. The air bag activation circuit is designed to activate the inflator 37 when a signal is inputted thereinto from a sensor SE (refer to FIGS. 1, 2) disposed in the front bumper 9 of the vehicle V for detecting a collision with a pedestrian.

Figure 5:
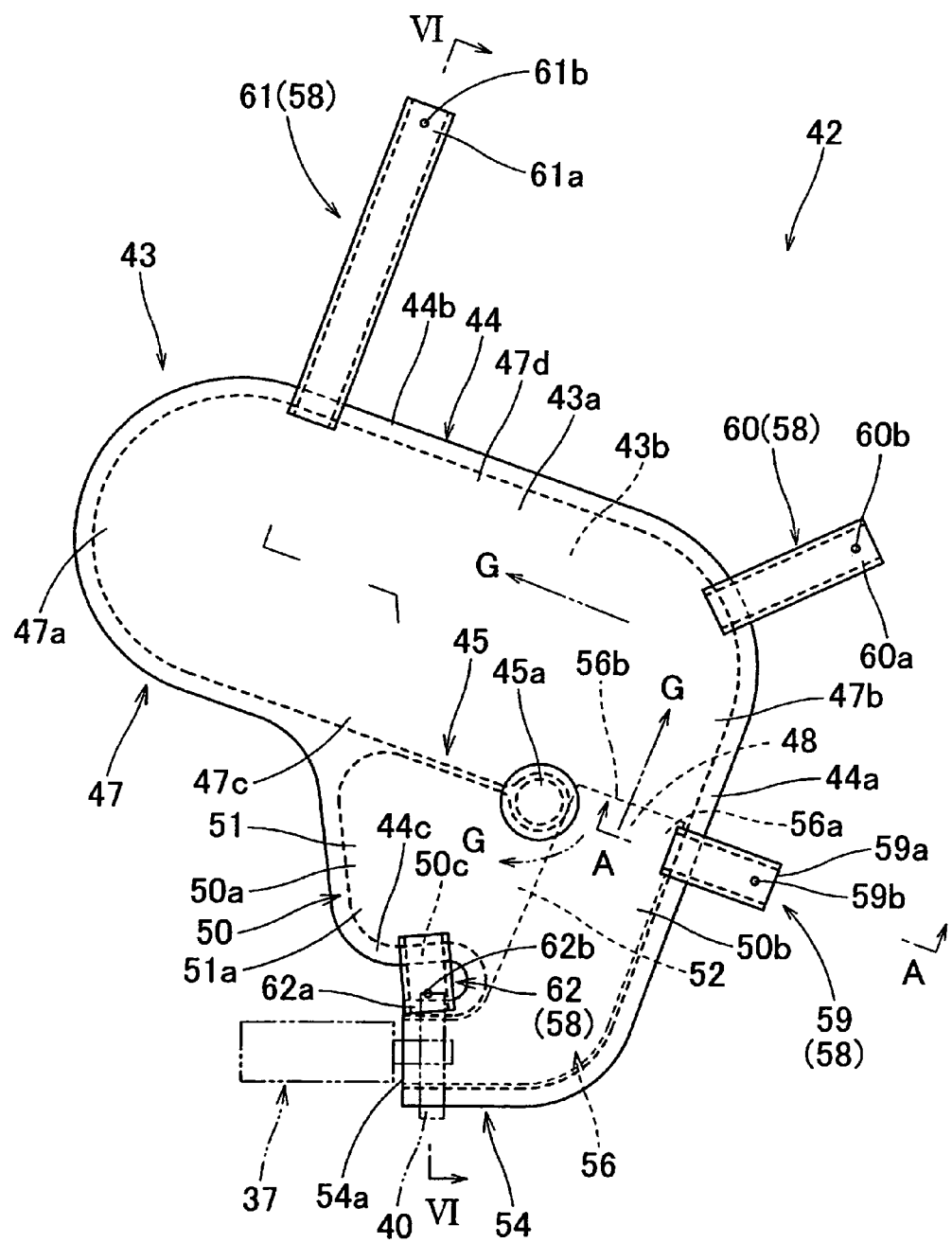
FIG. 5 is a plan view of a state in which an air bag used in the air bag system of the first embodiment is deployed flat.
Figure 6:
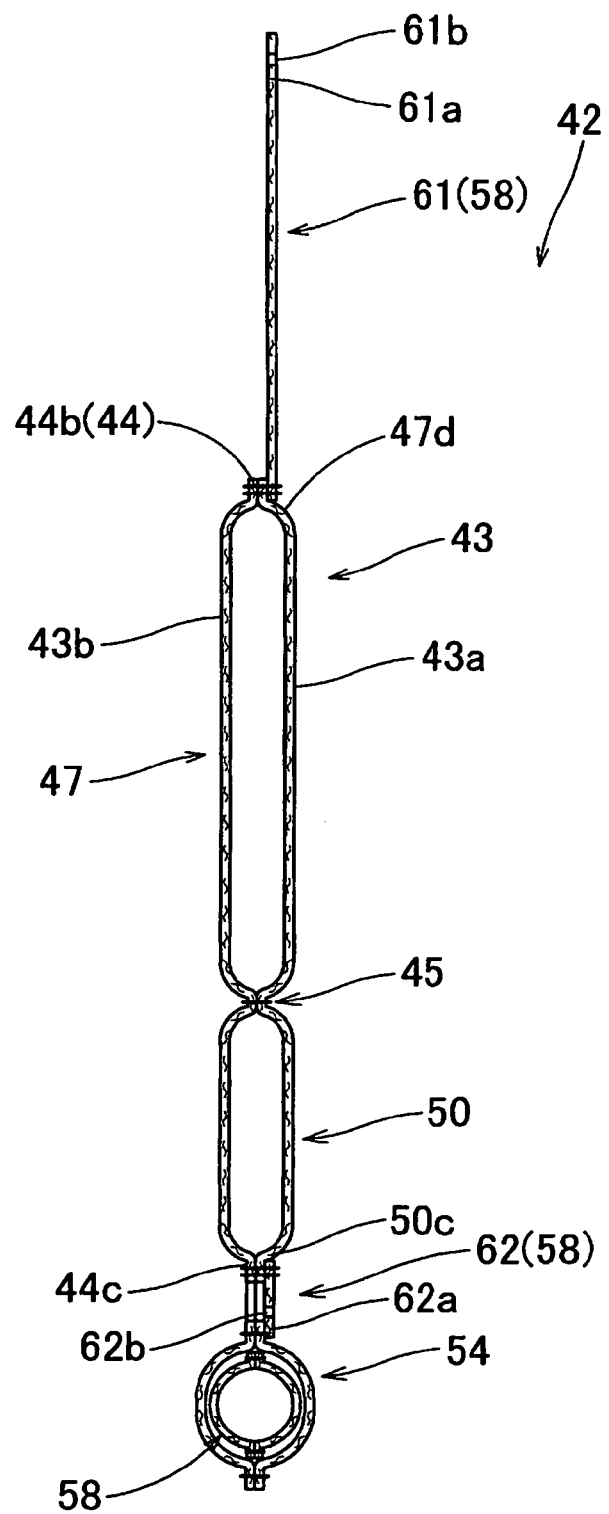
FIG. 6 is a vertical sectional view of the air bag shown in FIG. 5, the view showing a portion taken along the line VI-VI in FIG. 5.
Figure 7:
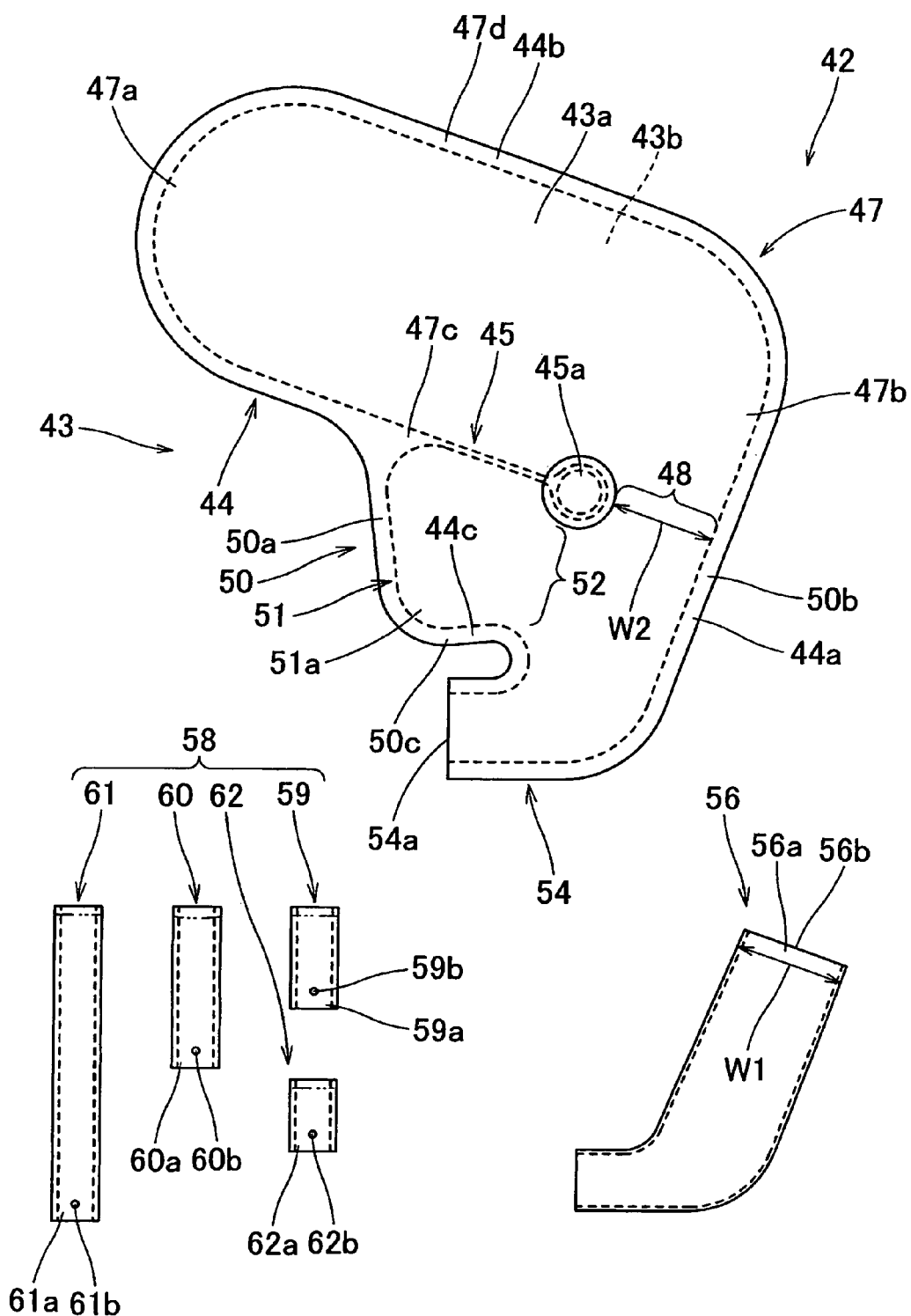
FIG. 7 is a plan view showing a bag main body, an inner tube and tethers of the air bag shown in FIG. 5 that are laid out separately.

As is shown in FIGS. 5 to 7, the air bag 42 includes a bag-shaped bag main body 43 having flexibility and able to inflate by allowing the inflation gas to flow thereinto, an inner tube 56 which is disposed within the bag main body 43 and tethers 58 which extend from a circumferential edge of the bag main body 43.

In the case of the embodiment, the bag main body 43 has a vehicle body side wall portion 43b which is disposed on a side facing the front pillar 1 when the bag main body 43 completes its inflation and a wall portion on a side facing the vehicle's outer side or an outer wall portion 43a. The bag main body 43 is configured as a flat bag by connecting together circumferential edges of the vehicle body side wall portion 43b and the outer wall portion 43a which are deployed flat. In the case of the embodiment, the bag main body 43 is formed by stitching together circumferential edges of base fabrics that are cut into a predetermined shape from a woven fabric made of polyester fibers or polyamide fibers using stitching threads. To describe this in detail, the bag main body 43 is formed in a way described below. The outer wall portion 43a and the vehicle body side wall portion 43b are stitched together along a circumferential edge portion 44 which is formed along full circumferences of outer circumferential edges of the outer wall portion 43a and the vehicle body side wall portion 43b excluding portions corresponding to an opening 54a, which will be described later, of the gas inlet port portion 54 and a dividing portion 45 which is formed within an area surrounded by the circumferential edge portion 44 using stitching threads so that the outer wall portion 43a and the vehicle body side wall portion 43b are connected together while the remaining portions of the outer wall portion 43a and the vehicle body side wall portion 43b are allowed to be separated from each other so as to allow the inflation gas to flow into an interior of a space defined between the two wall portions. The dividing portion 45 extends from the circumferential edge portion 44 substantially along an axial direction (a front-rear direction) of the front pillar 1 and is disposed so as to divide the air bag main body 43 into a pillar covering portion 47 and a fitting cell portion 50, which will both be described later. In the case of the embodiment, a terminal end portion 45a, which is stitched substantially into a circle, is formed at a distal end (front end) side of the dividing portion 45 so as to prevent the occurrence of stress concentration.

The bag main body 43 includes the pillar covering portion 47 which is disposed to cover the front surface 1a of the front pillar 1 when it completes its inflation, the fitting cell portion 50 which is disposed to lie below the pillar covering portion 47 when it completes its inflation and the gas inlet port portion 54 through which the inflation gas is allowed to flow into the interior of the bag main body 47.

Figure 10:
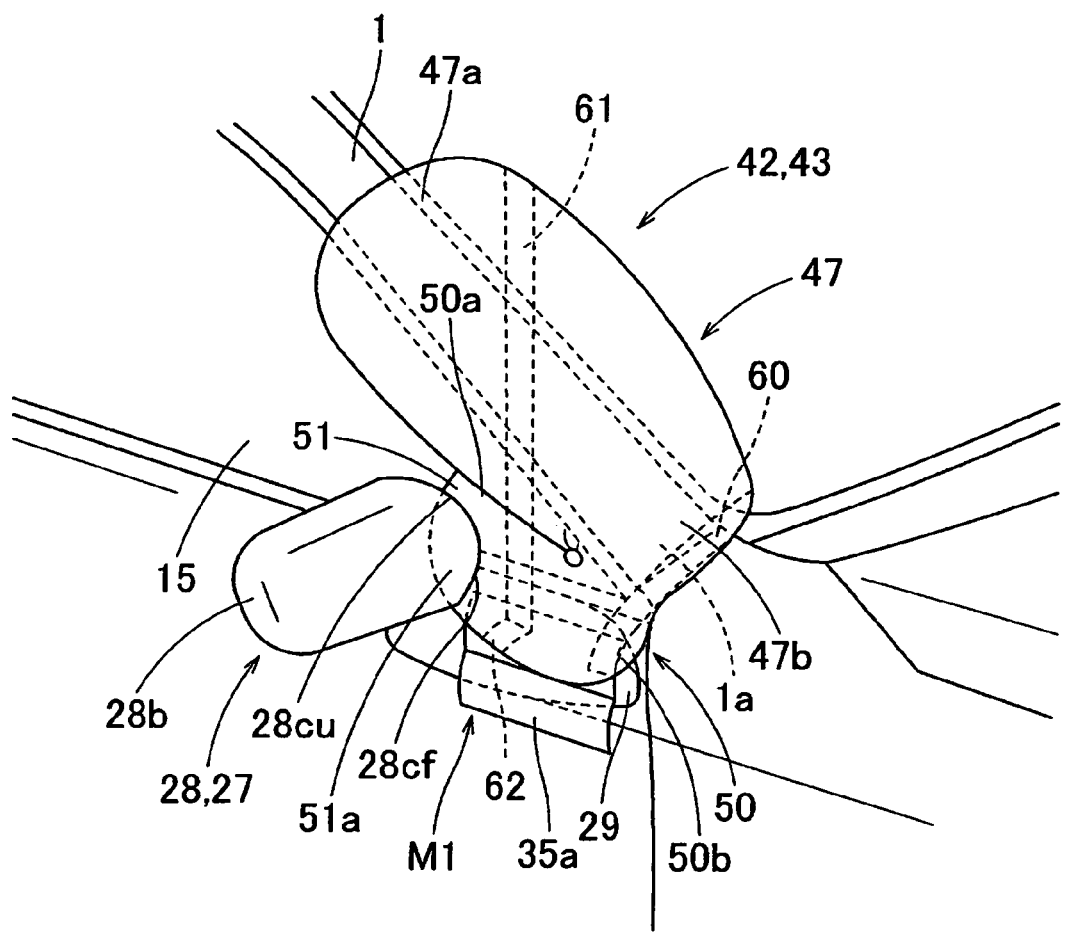
FIG. 10 is a schematic perspective view showing a state in which the air bag completes its inflation when the air bag system of the first embodiment is activated.

The pillar covering portion 47 has, as a shape resulting at the time it completes its inflation, a substantially rod-like shape whose longitudinal direction extends substantially along the axial direction (the front-rear direction) of the front pillar 1, so as to cover the front surface 1a side of the front pillar 1 on an area extending from the proximal portion 1b constituting the lower end side to a position lying in proximity to a vertical center of the front pillar 1 when the pillar covering portion 47 completes its inflation (refer to FIG. 10). In the case of the embodiment, a rear end 47a side of the pillar covering portion 47 is designed to be positioned further rearwards than the mirror main body 28 when the pillar covering portion 47 completes its inflation. In addition, the pillar covering portion 47 includes an inlet opening 48 which is designed to be positioned at a front end 47b side when the pillar covering portion 47 completes its inflation for allowing the inflation gas G to flow therethrough into the interior of the pillar covering portion 47. In the case of the embodiment, the inlet opening 48 is made up of an area defined between a front side portion 44a of the circumferential edge portion 44 and the terminal end portion 45a of the dividing portion 45 as in a state in which the bag main body 43 is deployed flat (refer to FIGS. 5, 7).

The fitting cell portion 50 is installed so as to cover a lateral side of a portion of the side window 14 lying below the front pillar 1 when it completes its inflation (refer to FIG. 11) and has, as a shape resulting at the time it completes its inflation, a rod-like shape whose longitudinal direction extends substantially along an axial direction (a front-rear direction) of the pillar covering portion 47. This fitting cell portion 50 is connected with the pillar covering portion 47 via the dividing portion 45 which extends from the circumferential edge portion 44. In other words, the fitting cell portion 50 is connected to a right edge 47c (an outer edge) of the pillar covering portion 47 over a whole area in the front-rear direction thereof in such a state that the bag main body 43 is deployed flat while being closed and separated from the pillar covering portion 47 at a rear end 50a side thereof (refer to FIGS. 5, 7). In addition, as is shown in FIGS. 10, 13, the fitting cell portion 50 is designed to fit in a space H1 which is defined between the mirror main body 28 of the outer rearview mirror 27 and the side window 14 which constitutes a lateral side of the vehicle on an upper surface side of the outside rear view mirror 27 at a rear portion 51 thereof which constitutes the rear end 50a side when the fitting cell portion 50 completes its inflation. To describe this in detail, when the air bag 42 completes its deflection, an area on a lower side of the rear portion 51 of the fitting cell portion 50 is fitted in the space H1 between the mirror main body 28 and the side window 14 (in particular, an area on a left-hand end face 28c of the mirror main body 28 which extends from a left-hand upper end face 28cu to a left-hand front end face 28uf and the side window 14) (refer to FIGS. 10, 13). In the case of the embodiment, a length dimension in the front-rear direction of the fitting cell portion 50 is made approximately half a length dimension in the front-rear direction of the pillar covering portion 47, and a front end 50b of the fitting cell portion 50 is made to coincide substantially with a front end 47b of the pillar covering portion 47. Namely, when the air bag 42 completes its inflation, the fitting cell portion 50 is disposed below roughly a front half area of the pillar covering portion 47 so as to support a lower side of a front end 47b side (a proximal portion side) of the pillar covering portion 47. In addition, the fitting cell portion 50 includes an inlet opening 52 for allowing the inflation gas to flow therethrough into the fitting cell portion 50. In the case of the embodiment, the inlet opening 52 is made up of an area defined between the front side portion 44a of the circumferential edge portion 44 and the terminal end portion 45a of the dividing portion 45 in such a state that the bag main body is deployed flat (refer to FIGS. 5, 7). Further, in the case of the embodiment, the fitting cell portion 50 communicates with a portion of the pillar covering portion 47 which lies in proximity to the front end 47b only through a front end 50b which lies in proximity to the inlet opening 52.

As is shown in FIGS. 5, 7, the gas inlet port portion 54 has a substantially cylindrical shape which is bent so that a distal end side is directed to the rear while projecting to the left from a portion lying in proximity to the front end 50b of the fitting cell portion 50 in such a state that the bag main body 42 is deployed flat. The opening 54a into which the inflator 37 can be inserted is formed at a distal end side (a rear end side) of the gas inlet port portion 54. When the air bag completes its inflation, the gas inlet port portion 54 extends downwards from a front lower end of the fitting cell portion 50 which inflates to project upwards from the case portion 33 so as to be connected to the inflator 37 below the case portion 33. In the case of the embodiment, this gas inlet port portion 54 enables the inflator 37 to be coupled thereto by making use of the clamp 40 fitted on a circumferential edge of the opening 54a in such a state that the inflator 37 is inserted into an interior of the gas inlet port portion 54 from the opening 54a via the inner tube 56 (refer to the chain double-dashed lines in FIG. 5).

As is shown in FIG. 5, the inner tube 56 is such as to guide an inflation gas discharged from the inflator 37 to the pillar covering portion 47 side within the bag main body 43. The inner tube 56 has a substantially cylindrical shape which is opened at both end sides and which can be inserted into the gas inlet port portion 54 and is installed so as to extend from the gas inlet port portion 54 to the inlet opening 48 of the pillar covering portion 47. Namely, the inner tube 56 extends across the inlet opening 52 of the fitting cell portion 50 so that an opening 56b provided at a distal end 56a is disposed in proximity of the inlet opening 48 of the pillar covering portion 47. Then, as is shown in FIG. 5, the inflation gas G discharged from the inflator 37 passes through the inner tube 56 to flow firstly from the opening 56b provided at the distal end side 56a into the pillar covering portion 47. In this embodiment, by installing the inner tube 56 within the bag main body 43, the pillar covering portion 47 is allowed to be positioned further upstream of the inflation gas G which flows into the air bag 42 than the fitting cell portion 50. In the case of the embodiment, as with the bag main body 43, the inner tube 56 is formed of a woven fabric made of polyester fibers or polyamide fibers. In addition, in the case of the embodiment, a width dimension W1 of the inner tube 56 which is deployed flat is made slightly smaller than a spaced-apart distance between the terminal end portion 45a of the dividing portions and the front side portion 44a of the circumferential edge portion 44 of the bag main body 43 which is deployed flat (an opening width dimension W2 of the inlet opening 48) (refer to FIG. 7). Additionally, as is shown in FIG. 5, the distal end 56a of the inner tube 56 is positioned further inwards (leftwards) than the terminal end portion 45a of the dividing portion 45. In other words, the distal end 56a of the inner tube 56 is made to enter the interior of the inlet opening 48 of the pillar covering portion 47 so that the inflation gas G flowing out of the opening 56b is restrained from flowing towards the fitting cell portion 50 side at an initial stage of inflation of the air bag 42 to thereby make the inflation gas G flow into the pillar covering portion 47 in an ensured fashion.

The tethers 58 extend from the circumferential edge of the bag main body 43 and are attached to the storage portion P1 (the case portion 33) side at distal end sides thereof so as to control the position where the bag main body 43 is disposed and the shape of the bag main body 43 resulting when the bag main body 43 completes its inflation. In the case of the embodiment, as is shown in FIG. 5, the tethers 58 are formed at four locations. In the air bag 42 (the bag main body 43) which completes its inflation, the tethers 58 includes a front strap portion 59 which extends from a front edge side of the fitting cell portion 50, a front inner strap portion 60 which extends from a position in proximity to a front left-hand corner (in proximity to a front inner edge) of the pillar covering portion 47, a inner strap portion 61 which extends from a left edge (an inner edge) 47d side of the pillar covering portion 47 and a lower strap portion 62 which extends from an outer edge (a lower edge at the time the air bag 42 (the bag main body 43) completes its inflation) 50c side of the fitting cell portion. The respective front strap portion 59, front inner strap portion 60, inner strap portion 61 and lower strap portion 62 are made as separate members from the bag main body 43, and as with the bag main body 43, the respective strap portions are made by forming a woven fabric made of polyamide fibers or polyester fibers into a strap shape. The respective strap portions are stitched securely to the circumferential edge portion 44 of the bag main body 43 at proximal portion sides thereof.

Figure 12:
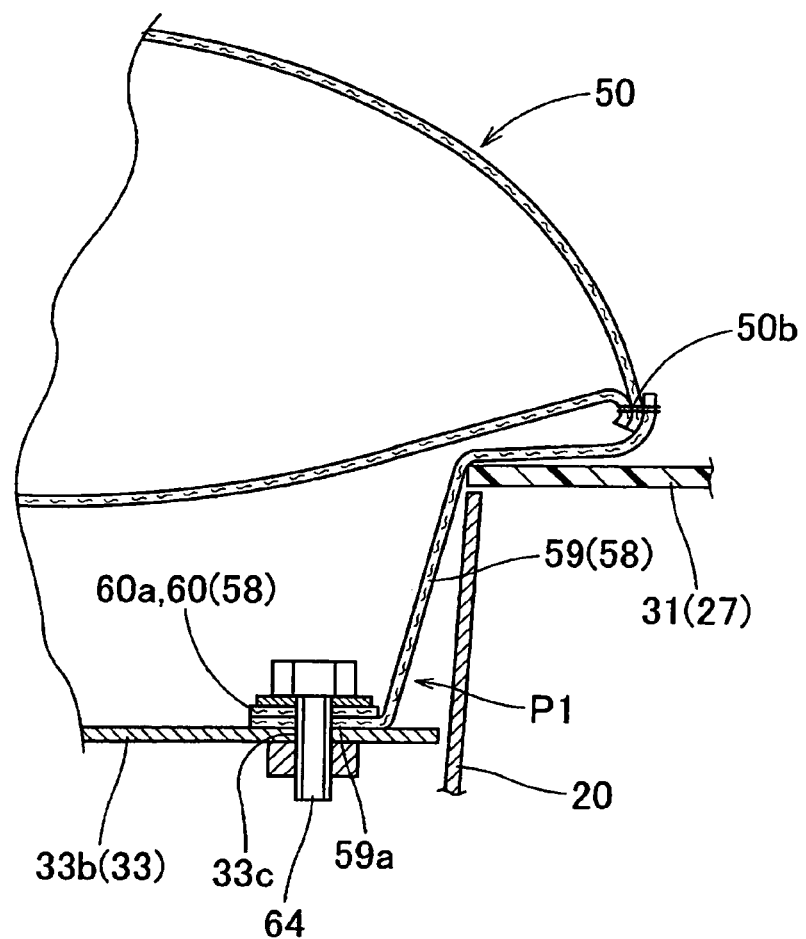
FIG. 12 is a schematic sectional view showing a portion taken along the line A-A in FIG. 5 that lies in proximity to a front end of a fitting cell portion at the time the air bag completes its inflation when the air bag system of the first embodiment is activated.

In the case of the embodiment, the front side trap portion 59 extends from a position which lies in front of the terminal end portion 45a of the dividing portion 45, or, specifically speaking, from a position in proximity to a front left-hand corner (in proximity to a front inner corner) of the fitting cell portion 50 on the front side portion 44a of the circumferential portion 44 which constitutes the front edge side of the fitting cell portion 50. The front strap portion 59 has an insertion hole 59b through which a bolt 64 can be inserted on a distal end 59a side. In the case of the embodiment, in such a state that the bag main body 43 and the tethers 58 are deployed flat, the front strap portion 59 is formed so as to extend forwards substantially at right angles to the front side portion 44a of the circumferential edge portion 44 (refer to FIG. 5). This front strap portion 59 is attached to the storage portion P1 side by fastening the distal end 59a side with a bolt 64 to the location of the mounting hole 33c which is formed in an area of the lower wall portion 33b which lies in proximity to a front end of the case portion 33 which constitutes the storage portion P1 (refer to FIG. 12). In addition, this front strap portion 59 is installed so as to extend downwards substantially right below the front edge of the fitting cell portion 50 as is shown in FIG. 12 when the air bag 42 completes its inflation. A length dimension of the front strap portion 59 is set to such a length dimension as to prevent a forward movement of the fitting cell portion 50 when the air bag 42 completes its inflation and as not to interrupt a quick deployment (a projection obliquely upwards towards the right) of the fitting cell portion 50 at an initial stage of inflation. Thus, the fitting cell portion 50 is restrained from moving forwards by the front strap portion 59 when the air bag 42 completes its inflation.

The front inner strap portion 60 extends from a position lying in proximity to a front left-hand corner (in proximity to a front inner edge) of the pillar covering portion 47 on the front side portion 44a of the circumferential edge portion 44. In the case of the embodiment, the front inner strap portion 60 is formed to extend from a left end of the front side portion 44a of the circumferential edge portion 44 in such a state that the bag main body 43 and the tethers 58 are deployed flat (refer to FIG. 5). An insertion hole 60 through which a bolt 64 can be inserted is formed at a distal end 60a side of the front inner strap portion 60, and the front inner strap portion 60 is attached to the storage portion P1 side by the distal end 60a side being fastened to the location of the mounting hole 33c in the case portion 33 with the bolt 64 together with the distal end 59a side of the front strap portion 59 (refer to FIG. 12). This front inner strap portion 60 is installed so as to extend obliquely downwards to the right (outwardly downwards) as is shown in FIG. 10 when the air bag 42 completes its inflation. A length dimension of the front inner strap portion 60 is set to such a length dimension as to prevent the front end 47b side of the pillar covering portion 47 from rising from the front pillar 1 and as not to interrupt the quick deployment of the pillar covering portion 47 when the air bag 42 completes its inflation. Thus, the pillar covering portion 47 is restrained by the front inner strap portion 60 from oscillating in the front-rear direction to cause the front end 47b side to rise from the front pillar 1 when the air bag 42 completes its inflation.

The inner strap portion 61 extends from a left-hand side portion 44b of the circumferential edge portion 44 which constitutes an inner edge (a left edge 47d) side of the pillar covering portion 47. In the case of the embodiment, the inner strap portion 61 is installed at a portion in proximity to a rear end 47a of the pillar covering portion 47. The inner strap portion 61 has an insertion hole 61b through which a bolt 65 can be inserted at a distal end 61a side thereof. In the case of the embodiment, the inner strap portion 61 is formed so as to extend to the left substantially at right angles to the left-hand side portion 44b of the circumferential edge portion 44 when the bag main body 43 and the tethers 58 are deployed flat (refer to FIG. 5). In addition, the inner strap portion 61 is attached to the storage portion P1 side by a distal end 61a side being fastened with a bolt 65 to the location of the mounting hole 33d which is formed in an area of the inner wall portion 33a which lies in proximity to the rear end of the case portion 33 (the area at the front end of the mirror main body 28) which constitutes the storage portion P1 (refer to FIG. 11). In addition, the inner strap portion 61 is installed so as to extend obliquely downwards to the right (outwardly downwards) as is shown in FIG. 10 when the air bag 42 completes its inflation. A length dimension of the inner strap portion 61 is set to such a length dimension as to prevent the left edge 47*d* side (in proximity to the rear end 47*a*) from rising from the front pillar 1 and as not to interrupt the quick deployment of the pillar covering portion 47 when the air bag 42 completes its inflation. Thus, the inner edge (the left edge 47*d*) side of the pillar covering portion 47 which constitutes a side lying far apart from the fitting cell portion 50 can be restrained from rising from the front pillar 1 when the air bag 42 completes its inflation, whereby the pillar covering portion 47 can be disposed so as to follow the front pillar 1 (fall towards the front pillar 1 side) when the air bag 42 completes its inflation.

The lower strap portion 62 extends from a right-hand side portion 44*c* of the circumferential portion 44 which constitutes an outer edge (a lower edge when fully inflated) 50*c* side of the fitting cell portion 50. In the case of the embodiment, the lower strap portion 62 is installed at a portion in proximity to a front edge of the right-hand side portion 44*c* (in proximity to a front right end of the fitting cell portion 50). Namely, the lower strap portion 62 is installed in an area of the fitting cell portion 50 that is shifted to the front from the rear portion 51 which is fitted in the space H1 defined between the mirror main body 28 and the side window 14. The lower strap portion 62 is formed so as to extend to the right substantially at right angles to the right-hand side portion 44*c* of the circumferential edge portion 44 when the bag main body 43 and the tethers 58 are deployed flat (refer to FIG. 5). A insertion hole 62*b* through which a bolt 65 can be inserted is formed at a distal end 62*a* side of the lower strap portion 62, and the lower strap portion 62 is attached to the storage portion P1 side by the distal end 62*a* side being fastened with a bolt 65 to the location of the mounting hole 33*d* of the case portion 33 together with the distal end 61*a* side of the inner strap portion 61 (refer to FIG. 11). This lower strap portion 62 is installed so as to extend to the left (the vehicle's inner side I) as is shown in FIG. 11 when the air bag 42 completes its inflation. A length dimension of the lower strap portion 62 is set to such a length dimension as to pull a lower edge (an outer edge 50*c*) of the fitting cell portion 50 towards the storage portion P1 side and as not to interrupt the quick deployment of the fitting cell portion 50. Thus, the fitting cell portion 50 which projects to the vehicle's outer side O from the storage portion P1 (the case portion 33) can be restrained from moving as if falling downwards at a portion lying further outwards towards the vehicle's outer side than the storage portion P1 (the case portion 33) by the lower strap portion when the air bag 42 completes its inflation.

In the air bag system M of the first embodiment, the air bag 42 is folded over the area of the bag main body 42 excluding the gas inlet port portion 54 into a predetermined shape which enables the air bag 42 so folded to be stored within the case portion 33 from the state in which the outer wall portion 42*a* and the vehicle body side wall portion 43*b* are deployed flat and are superposed one on the top of the other. Then, the air bag 42 so folded can be stored within the case portion 33 with the distal ends of the tethers 58 (the respective distal ends 59*a*, 60*a*, 61*a*, 62*a* of the front strap portion 59, front inner strap portion 60, inner strap portion 61, lower strap portion 62) fastened to the case portion 33 with the bolts 64, 65 and the gas inlet port portion 54 caused to project from an opening, not shown. The gas inlet port portion 54 which is projecting from the case portion 33 is connected to the inflator 37 by making use of the clamp 40 and the inflator 37 is fastened to the outer reinforcement 20 with the bolts 38*a*, whereby the air bag system M1 can be mounted on the mounting member 30 of the outside rearview mirror 27.

In the air bag system M1 of the first embodiment, when the inflator 37 is activated after the system is installed in the vehicle V, an inflation gas discharged from the inflator 37 flows into the air bag 42, and the inflating air bag 42 push opens the air bag cover 35. The air bag 42 projects from an opening generated when the air bag cover 35 is so push opened and then completes its inflation as indicated by the chain double-dashed lines in FIGS. 1 to 3 and in FIGS. 10, 11, 13.

In addition, in the air bag system M1 of the first embodiment, the air bag 42 has the fitting cell portion 50 which is separated from the pillar covering portion 42 which covers the front surface 1*a* of the front pillar 1 and which is fitted in the space defined between the mirror main body 28 of the outside rearview mirror 27 and the side window 14 which constitutes the lateral side of the vehicle (specifically speaking, the space H1 defined between the left end face 28*c* of the mirror main body 28 and the side window 14) on the upper surface side of the outside rearview mirror 27 at the rear portion 51 which constitutes the rear end side thereof. Therefore, when the air bag 42 completes its inflation, the side in the left-right direction (the vehicle's inside-outside direction) of the fitting cell portion 50 is fastened by the mirror main body 28 of the outside rearview mirror 27 or the side window 14, whereby a deflection of the fitting cell portion 50 in the left-right direction (the vehicle's inside-outside direction) can be suppressed to an extreme extent. In the case of the embodiment, an area 51*a* on a lower side of the rear portion 51 of the fitting cell portion 50 is fitted in the space H1 defined between the mirror main body 28 and the side window 14 (refer to FIG. 13).

In addition, this fitting cell portion 50 is connected to the lower edge (the right edge 47*c* of the pillar covering portion 47 which is deployed flat) side of the pillar covering portion 47 over the whole area in the front-rear direction of the fitting cell portion 50. As a result, in the air bag system M1 of the first embodiment, the pillar covering portion 47 which is covering the front surface 1*a* of the front pillar 1 can be supported by the fitting cell portion 50 which is restrained from deflection in the vehicle's inside-outside direction by the lower area 51*a* of the rear portion 51 being fitted in the space H1 defined between the mirror main body 28 and the side window 14 on the upper surface side of the outside rearview mirror 27 when the air bag 42 completes its inflation (refer to FIGS. 10, 13). Specifically speaking, in the air bag system M1 of the first embodiment, the fitting cell portion 50 is fitted in the space H1 defined between the left end face 28*c* of the mirror main body 28 and the door portion 18 which is positioned below the side window 14 so as to enter deep thereinto when the air bag 42 completes its inflation (refer to FIG. 13). As this occurs, the fitting cell portion 50 is disposed so that the rear portion 51 thereof is brought into press contact with the area of the left end face 28*c* of the mirror main body 28 which extends from the left end face 28*cf* to the left upper end face 28*cu* and that a side facing the vehicle's outer side or outer side of the rear portion 51 is locked by the proximal portion 28*a*. Because of this, in the air bag system M1 of the first embodiment, even in the event that the pillar covering portion 47 is pressed strongly by a pedestrian when the pillar covering portion 47 receives the pedestrian, the pillar covering portion 47 is supported by the fitting cell portion 50 which is fitted in the space H1 defined between the mirror main body 28 and the side window 14 at the rear portion 51 thereof, whereby the pillar covering portion 47 can be prevented from being shifted largely laterally towards the vehicle's outer side.

Consequently, in the air bag system M1 of the first embodiment, the lateral shift of the pillar covering portion 47 which occurs when the pillar covering portion 47 receives a pedestrian can be suppressed accurately when the air bag 42 completes its inflation to thereby cover the front surface 1a of the front pillar 1.

Figure 8:
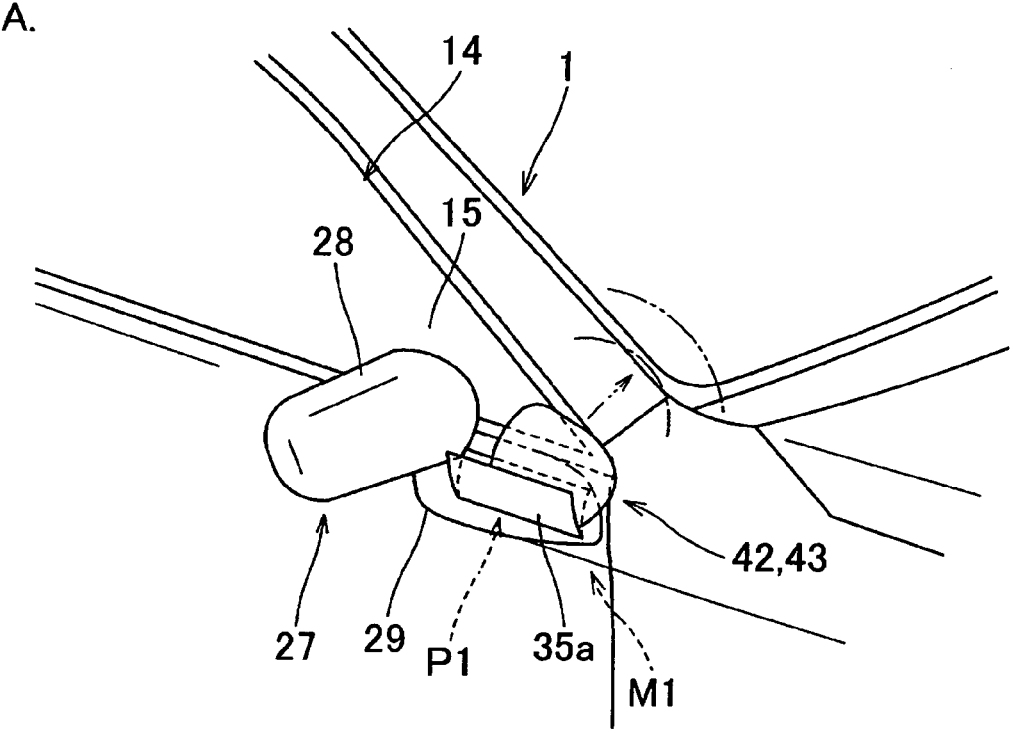
FIG. 8 is a partially enlarged perspective view illustrating inflation steps of an inflation process of the air bag in the air bag system of the first embodiment.
Figure 8:
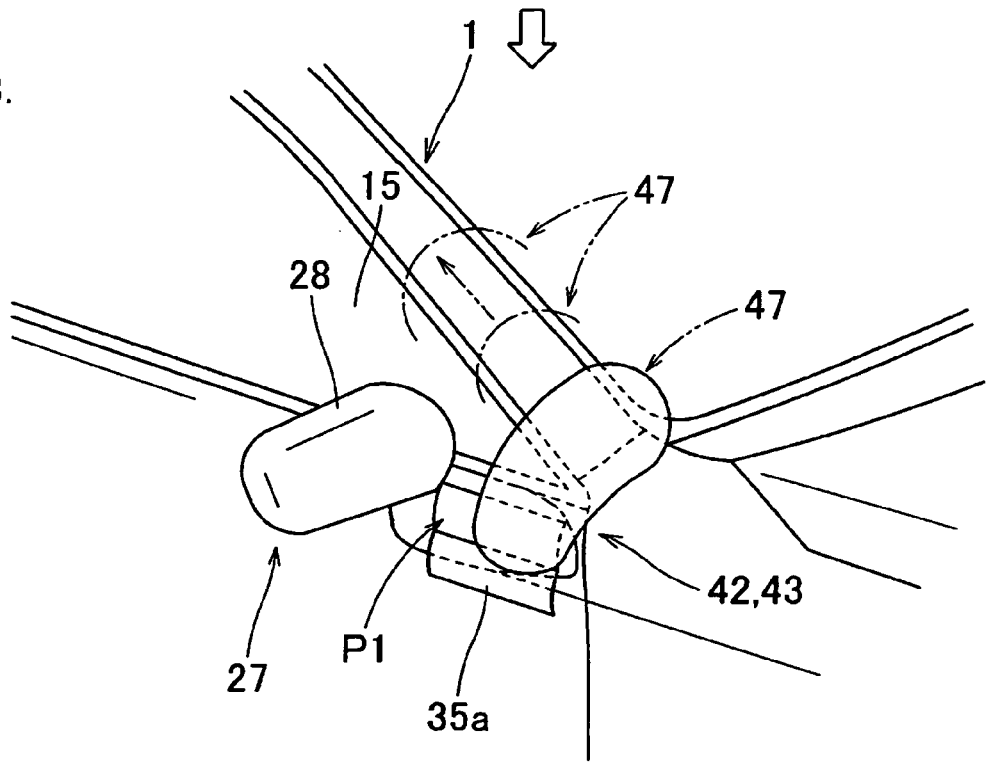
Figure 9:
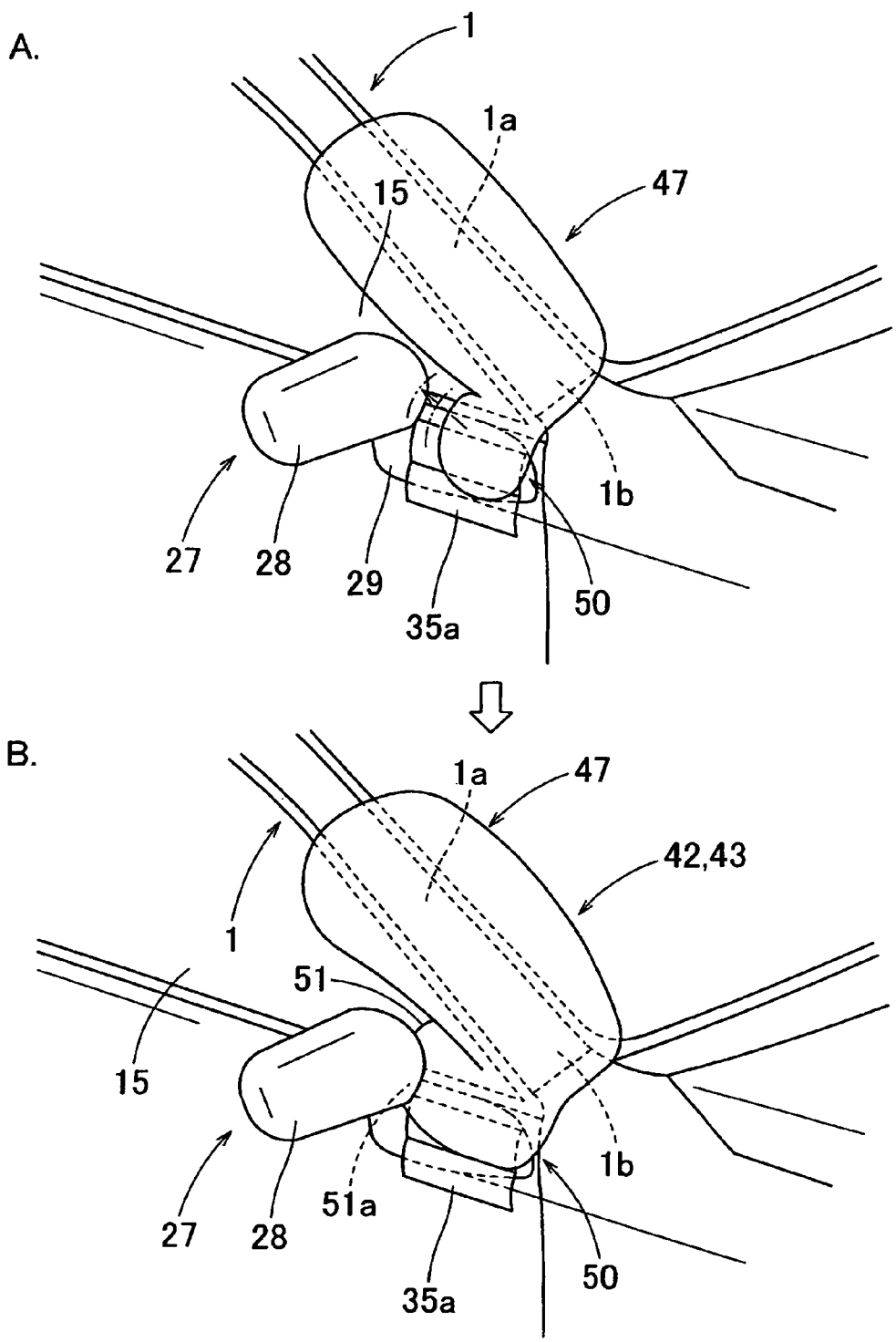
FIG. 9 is a partially enlarged perspective view illustrating the inflation process of the air bag in the air bag system of the first embodiment, the view illustrating inflation steps occurring after the steps shown in FIG. 8.

In addition, in the air bag system M1 of the first embodiment, the pillar covering portion 47 is positioned further upstream of the inflation gas G which flows into the air bag 42 (the bag main body 43) than the fitting cell portion 50. Because of this, in the air bag system M1 of the first embodiment, when the air bag 42 (the bag main body 43) deploys and inflates, firstly, as is shown in FIG. 8 and at A in FIG. 9, by allowing the inflation gas G to flow thereinto the pillar covering portion 47 deploys and inflates so as to cover the front surface 1a of the front pillar. Thereafter, as is shown in FIG. 9, by allowing the inflation gas to enter the interior thereof the fitting cell portion 50 inflates. Specifically, in the air bag system M1 of the first embodiment, the cylindrical inner tube 56, which extends across the inlet opening 52 of the fitting cell portion 50 to thereby be opened towards the pillar covering portion 47 side so as to guide the inflation gas G discharged from the inflator 37 towards the pillar covering portion 47, is disposed in the bag main body portion 43. Therefore, at the initial stage of inflation of the air bag 42 (the bag main body portion 43), firstly, the inflation gas discharged from the inflator 37 flows in the inner tube 56 so as to inflate the inner tube 56 itself and then flows from the opening 56b at the distal end 56a side of the inner tube 56 which is positioned in proximity to the inlet opening 48 of the pillar covering portion 47 into the interior of the pillar covering portion 47, whereby the pillar covering portion 47 firstly completes its inflation so as to cover the front surface 1a of the front pillar 1. Thereafter, the inflation gas G flows from a space defined between the inner tube 56 and the inlet opening 48 of the pillar covering portion 47 into the fitting cell portion 50 by way of the inlet opening 52 of the fitting cell portion 50, whereby the fitting cell portion 50 inflates so that the lower area 51a of the rear portion 51 enters the space H1 defined between the left end face 28c of the mirror main body 28 and the side window 14.

Namely, in the air bag system M1 of the first embodiment, since when the air bag 42 deploys and inflates, the pillar covering portion 47 is designed to completes its inflation earlier than the fitting cell portion 50, and therefore, a behavior of the pillar covering portion 47 of being pushed upwards by the inflating fitting cell portion 50 is suppressed, whereby a deflection in the left-right direction (in the outside-inside direction) is suppressed, thereby making it possible to cover quickly and smoothly the front surface 1a of the front pillar 1 by the inflating pillar covering portion 47. In the configuration of the embodiment, when the fitting cell portion inflates first, when the fitting cell portion is designed to inflate first, since the fitting cell portion inflates into a rod-like shape which has a substantially circular cross section taken along the left-right direction, the fitting cell portion acts to push upwards the pillar covering portion which lies thereabove, whereby the pillar covering portion which is inflating is pushed upwards so as to be shifted to the vehicle's outer side from the front pillar, leading to a fear that the front surface of the front pillar cannot be covered smoothly by the pillar covering portion. In the air bag system M1 of the first embodiment, however, since the pillar covering portion 47 is designed to complete its inflation prior to the fitting cell portion 50 and when the pillar covering portion 47 completes its inflation, the fitting cell portion 50 has not yet inflated to almost any extent. Therefore, the pillar covering portion 47 can be restrained accurately from being raised by the fitting cell portion 50, thereby making it possible to cover quickly the front surface 1a of the front pillar 1 by the pillar covering portion 47.

In addition, in the air bag system M of the first embodiment, the fitting cell portion 50 starts to inflated by allowing the inflation bas to flow into the interior thereof after the pillar covering portion 47 completes its inflation so as to be disposed to cover the front surface 1a of the front pillar 1 in a stable fashion. Therefore, the fitting cell portion 50 is allowed to inflate so as to enter smoothly the space H1 defined between the left end face 28c of the mirror main body 28 and the side window 14. In particular, in the air bag system M1 of the first embodiment, the inlet opening 52 through which the inflation gas is allowed to flow into the fitting cell portion 50 is disposed at the front end 50b of the fitting cell portion 50, and the fitting cell portion 50 inflates so as to allow the inflation gas to flow thereinto from the front end 50b side towards the rear end 50a side. Because of this, the rear portion 51 of the fitting cell portion 50 which is inflating can be fitted in the space H1 defined between the left end face 28c of the mirror main body 28 and the side window 14 in an ensured fashion. When the pillar covering portion is designed to inflate first, the position of the inlet opening through which the inflation gas is allowed to flow into the fitting cell portion is not limited to what has been described above, and hence, a configuration may be adopted in which an inlet opening which communicates with the pillar covering portion may be provided on the upper or rear side of the fitting cell portion.

Further, in the air bag system M1 of the first embodiment, the inner tube 56 is disposed in the interior of the air bag 42 (the bag main body 43) and the pillar covering portion 47 is designed to inflate before the fitting cell portion 50 inflates. Therefore, not only can the configuration be made simple and easy, but also the pillar covering portion 47 can be made to inflate before the fitting cell portion 50 does. In addition, the inflation timing of the pillar covering portion 47 and the inflation timing of the fitting cell portion 50 (the timing at which the inflation gas starts to flow into the fitting cell portion 50) can be made substantially constant, thereby making it possible to suppress the occurrence of variation product by product. Unless this is taken into consideration, a configuration may be adopted in which a temporary connecting portion where the outer wall portion and the vehicle body side wall portion are connected together so as to temporarily close the inlet opening is provided at the portion of the fitting cell portion where the inlet opening is provided and the connected condition of the temporary connecting portion is released after the pillar covering portion has inflated, so as to allow the pillar covering portion to inflate first.

Furthermore, in the air bag system M1 of the first embodiment, the tethers 58 are installed in the air bag 42 which extend from the circumferential edge of the air bag 42 when it completes its inflation and are attached to the storage portion P1 side at the distal ends thereof. The tethers 58 include the inner strap portion 61 which extends from the inner edge (the left edge 47d) side of the pillar covering portion 47 which constitutes the side lying far apart from the fitting cell portion 50 and pulls the inner edge (the left edge 47d) of the pillar covering portion 47 towards the storage portion P1 side so as to restrain the pillar covering portion 47 from the front pillar 1 when the pillar covering portion 47 completes its inflation. By doing so, in the air bag 42 which completes its inflation, the front surface 1a side of the front pillar 1 can widely be covered by the pillar covering portion 47. In particular, in the air bag system M1 of the first embodiment, since the inner strap portion 61 is designed to extend from the position in proximity to the rear end 47a of the pillar covering portion 47, the portion in proximity to the rear end 47a of the pillar covering portion 47 can accurately be restrained from rising from the front pillar 1.

In addition, in the air bag system M1 of the first embodiment, the front strap portion 59 which is formed as the tether 58 extends downwards from the front edge side of the fitting cell portion 50 when its completes its inflation, so as to suppress a forward movement of the fitting cell portion 50. Therefore, when the air bag 42 completes its inflation, the fitting cell portion 50 is restrained from moving to the front to thereby be dislocated from the fitting condition between the left end face 28c of the mirror main body 28 and the side window 14, whereby the rear portion 51 of the fitting cell portion 50 can be disposed so as to fit in the space H1 defined between the left and face 28c of the mirror main body 28 and the side window in an ensured fashion.

In the air bag system M1 of the first embodiment, in the tethers 58, while the front strap portion 59 and the front inner strap portion 60 which are disposed on the front side are attached to the lower wall portion 33b side of the case portion 33 while the inner strap portion 61 and the lower strap portion 62 which are disposed on the rear side are attached to the inner wall portion 33a side of the case portion 33, the attaching positions of the respective front strap portion 59, front inner strap portion 60, inner strap portion 61 and lower strap portion 62 to the case portion 33 (the storage portion P1) side are not limited thereto, and hence, the respective strap portions may be attached to opposite positions to those in the embodiment. The front strap portion 59, front inner strap portion 60, inner strap portion 61 and lower strap portion 62 may, of course, be attached separately to the case portion 33 (the storage portion P1) side at their distal ends 59a, 60a, 61a, 62a sides, respectively.

Figure 14:
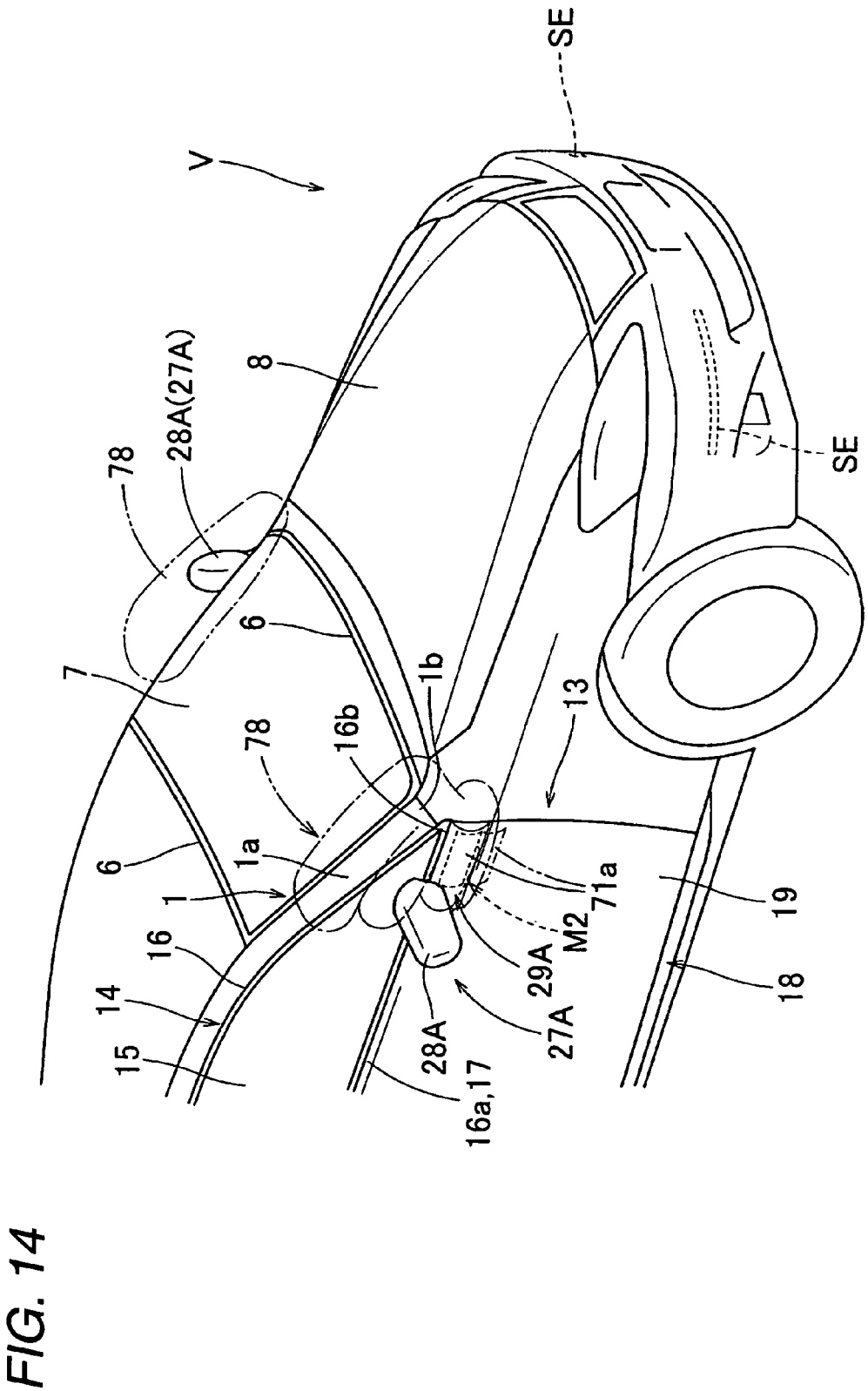
FIG. 14 is a partially enlarged side view of a vehicle in which an air bag system of a second embodiment is installed.
Figure 15:
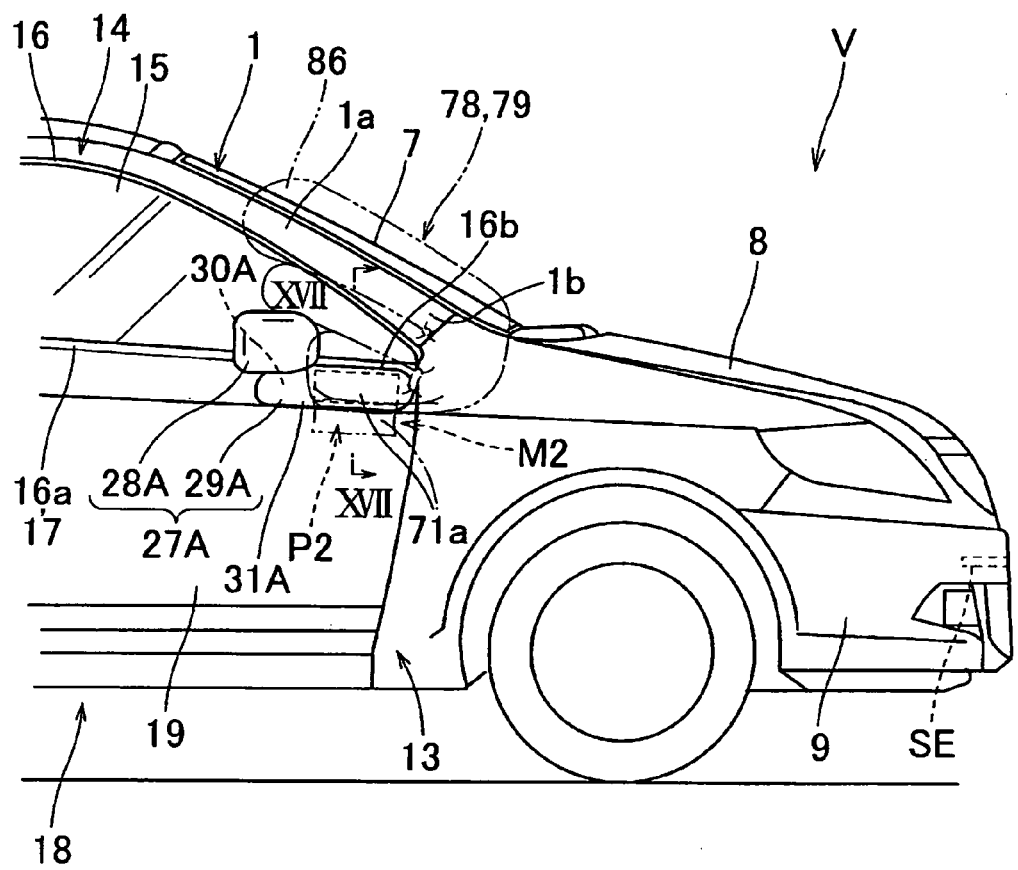
FIG. 15 is a partially enlarged plan view of the vehicle in which the air bag system of the second embodiment is installed.
Figure 16:
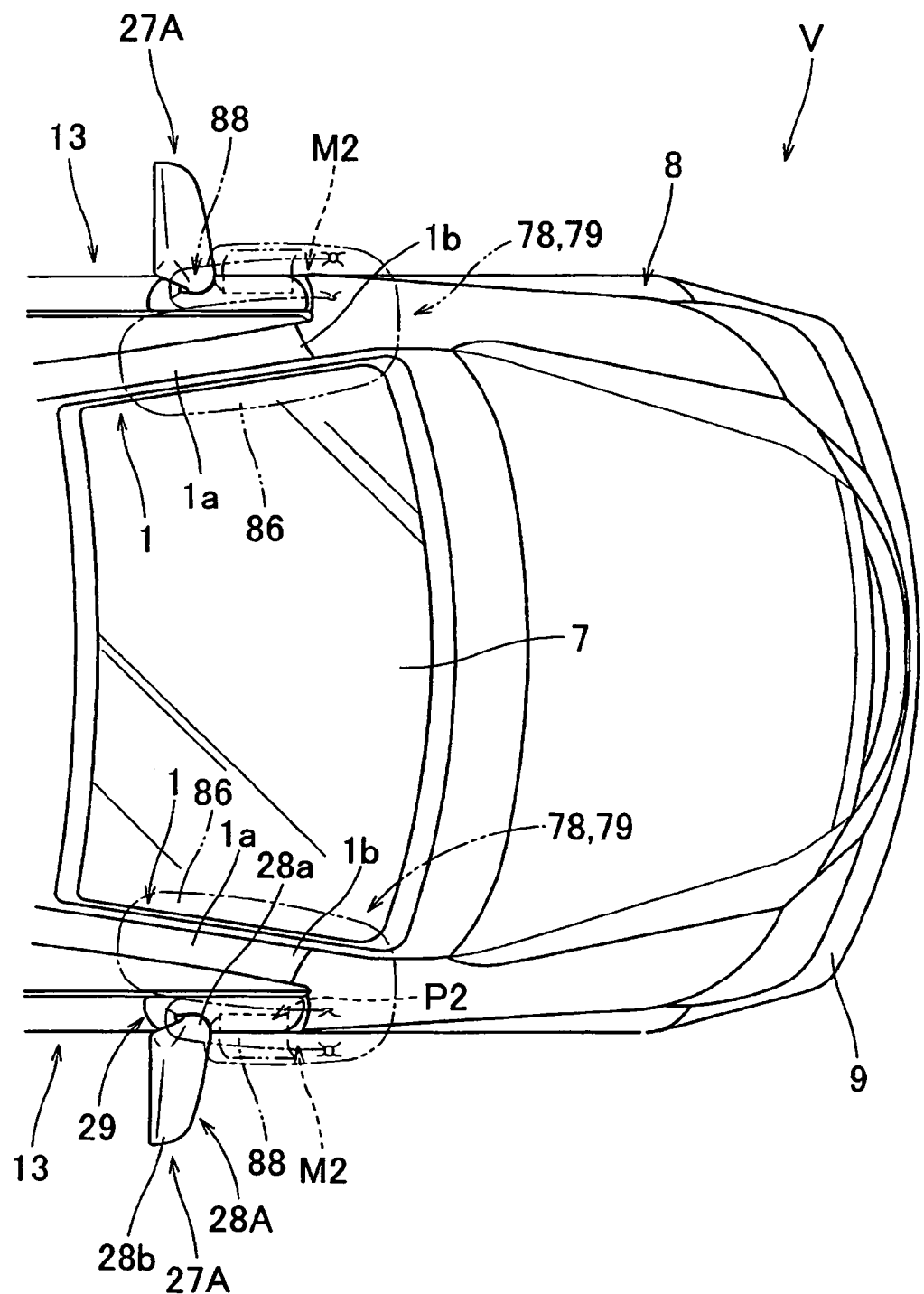
FIG. 16 is a partially enlarged plan view of the vehicle in which the air bag system of the second embodiment is installed.

Next, an air bag system M2 of a second embodiment of the invention will be described. A vehicle V in which an air bag system M2 of a second embodiment is installed is, as shown in FIGS. 14 to 16, has the same configuration as that of the vehicle V in which the air bag system M1 of the first embodiment is installed except for an outside rearview mirror 27A in which the air bag system M2 is installed. Thus, like reference numerals will be given to like members to those of the first embodiment, and the description thereof will be omitted herein.

In the second embodiment, too, an air bag system M2 will be described in detail which includes an air bag 78 adapted to cover a front surface 1a side of a front pillar 1 which is situated on a right-hand side of the vehicle V. An air bag system which includes an air bag adapted to cover a front surface side of a front pillar on a left-hand side has an axisymmetric shape with the air bag system on the right-hand side and is configured identically therewith. Thus, the description of the air bag system on the left-hand side will be omitted here.

In the outside rearview mirror 27A in which the air bag system M2 is installed, members other than a case portion 70 which is provided on a mounting member 30A which constitutes a mounting base 29A and an air bag cover 71 which is provided on the mounting member 30A are similar in configuration to those of the outside rearview mirror 27 in which the air bag system M1 is installed, and therefore, like reference numerals with A added at the ends thereof will be given to like members to those of the first embodiment, and the description thereof will be omitted here.

Figure 17:
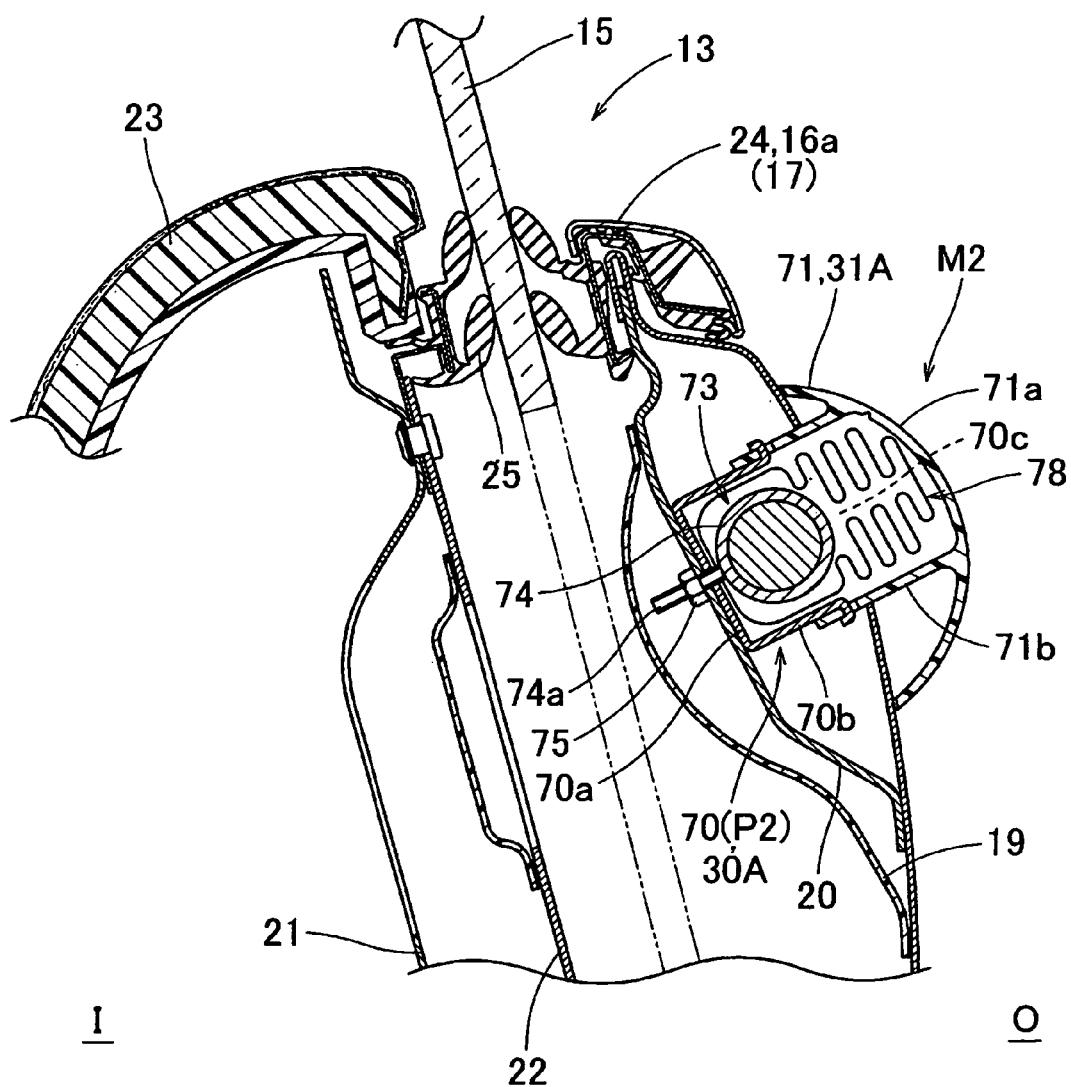
FIG. 17 is a schematic vertical sectional view showing a state in which the air bag system of the second embodiment is installed, the view showing a portion taken along the line XVII-XVII in FIG. 15.

As is shown in FIG. 17, the air bag system M2 includes a bag-shaped air bag 78 having flexibility and an inflator 73 for supplying an inflation gas into the air bag 78. A storage portion P2 which stores therein the air bag 78, which is folded, and the inflator 73 is made up of an area at a front of a mounting base 29A which lies in proximity to a front end of the outside rearview mirror 27A (refer to FIGS. 15, 17). The case portion 70 for storing the air bag 78, which is folded, and the inflator 73 is made up of the mounting member 30A of the mounting base 29A, and the air bag cover 71 which covers a side facing a vehicle's outer side or an outer side of the air bag 78 is made up of a cover member 31A of the mounting base 31A (refer to FIG. 17).

As is shown in FIGS. 15, 17, the case portion 70 is configured as being continued from the mounting member 30A and includes a bottom wall portion 70a and a circumferential wall portion 70b which extends from the bottom wall portion 70a. The case portion 70 is opened at a side facing a vehicle's outer side. In the case of the embodiment, the case portion 70 is brought into contact with an outer reinforcement 20 at the bottom wall portion 70a. The case portion 70 is mounted on the outer reinforcement 20, which constitutes a vehicle body side member, by providing bolts 74a for use in mounting the inflator 73 in the case portion 70 so as to project from the bottom wall portion 70a to thereby be fastened to the outer reinforcement 20 with nuts 75.

Figure 21:
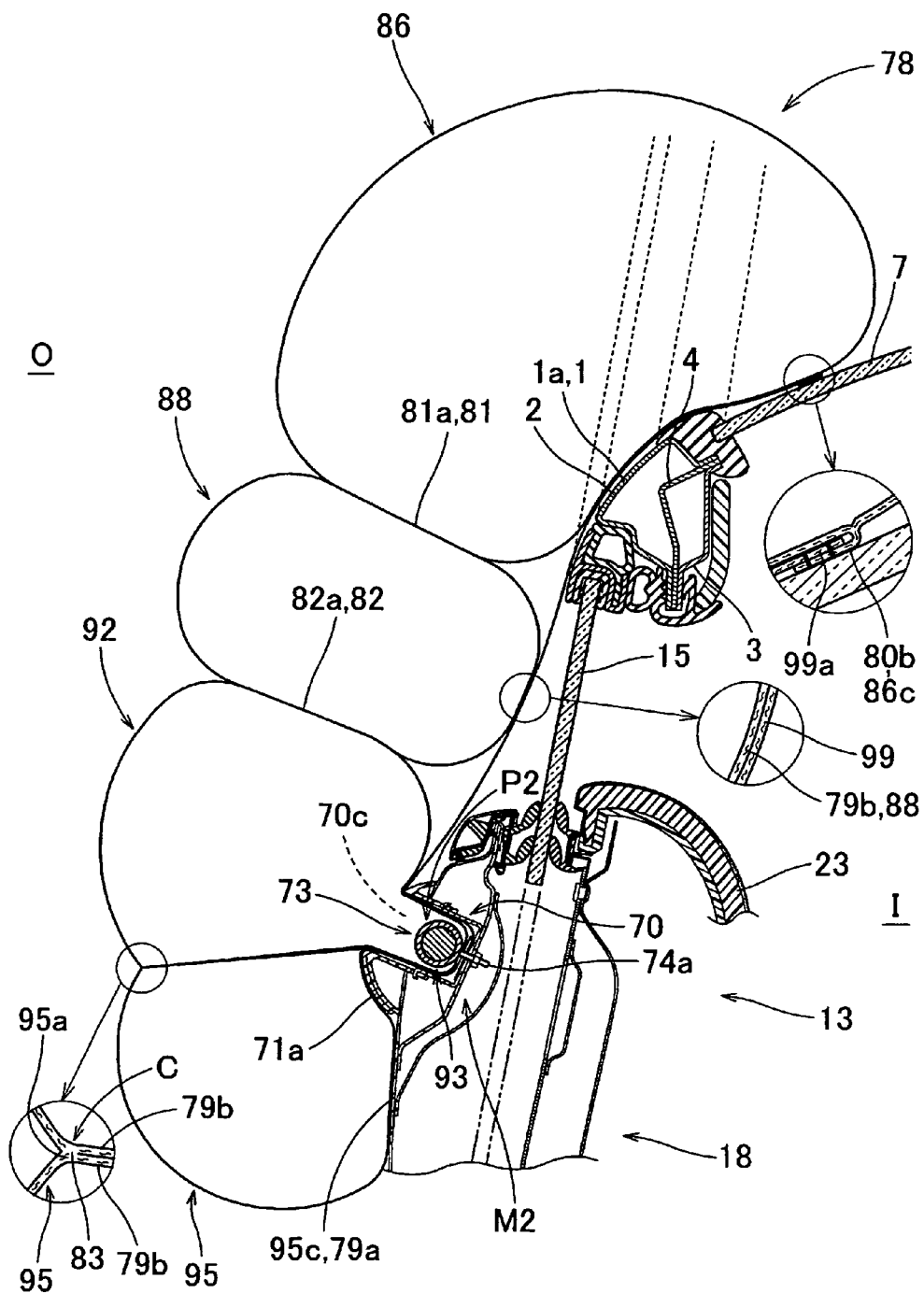
FIG. 21 is a schematic vertical sectional view showing a state in which the air bag completes its inflation when the air bag system of the second embodiment is activated.

The air bag cover 71 is configured as being continued from a cover member 31A and has a door portion 71a adapted to cover an opening 70c in the case portion 70 and a mounting wall portion 71a which extends from a circumferential edge of the door portion 71a to a vehicle's inner side I to thereby be mounted on the circumferential portion 70b of the case portion 70 (refer to FIG. 17). The door portion 71a opens when the air bag 78 inflates so as to allow the air bag 78 which inflates from the opening 70c in the case portion 70 to project. In the case of the embodiment, as is shown in FIG. 21, when it opens, the door portion 71a opens downwards in a rotating fashion about a lower end side thereof as a rotating center with an upper end made to open towards the vehicle's outer side and then downwards. A rupture anticipating portion (whose illustration is omitted) is provided around a circumferential edge of the door portion 71a excluding the lower end side, which rupture anticipating portion can be ruptured when the air bag 78 inflates.

As is shown in FIG. 17, the inflator 73 is of a cylinder type with its axis direction made to follow substantially the front-rear direction and includes a gas discharge port, not shown, which can discharge an inflation gas. The inflator 73 is held around the periphery thereof by a diffuser 74 made of sheet metal. The inflator 73 is incorporated within a inflatable mounting portion 92, which will be described later, of the air bag 78 and is fixed to the case portion 70 together with the air bag 78 by being fastened to an outer reinforcement 20 of a door portion 18 by fastening nuts 75 on bolts 74a which are provided on the diffuser 74 so as to project from the inflatable mounting portion 92 and then from the bottom wall portion 70a of the case portion 70. In the case of the embodiment, although not shown, the bolts 74a of the inflator 73 are formed on two locations lying along the front-rear direction. In addition, as with the inflator 37 of the air bag system M1 that has been described before, the inflator 73 is designed to supply an inflation gas into the air bag 78 by an activation signal which is inputted thereinto from a predetermined air bag activation circuit.

Figure 18:
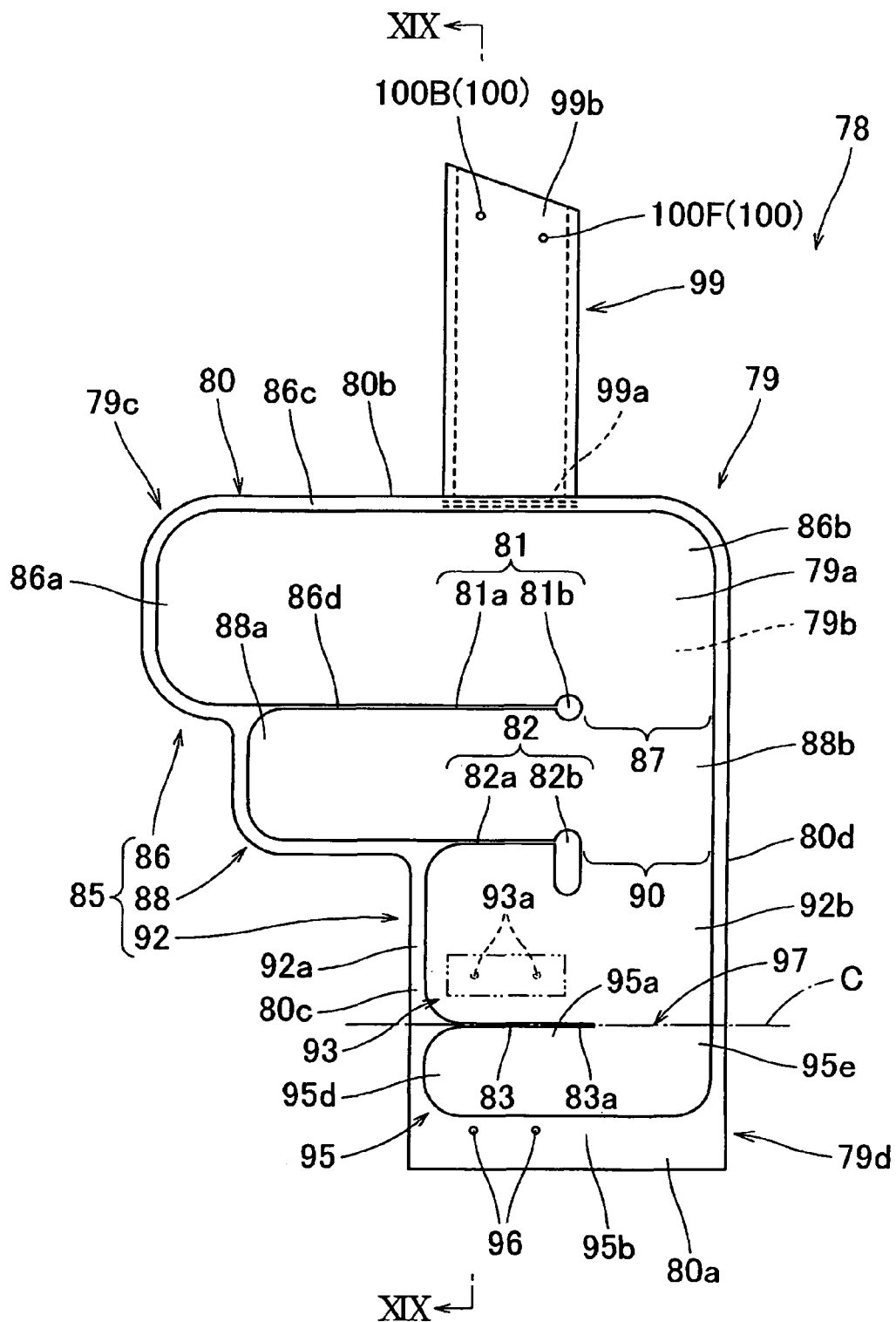
FIG. 18 is a plan view showing a state in which an air bag used in the air bag system of the second embodiment is deployed flat.
Figure 19:
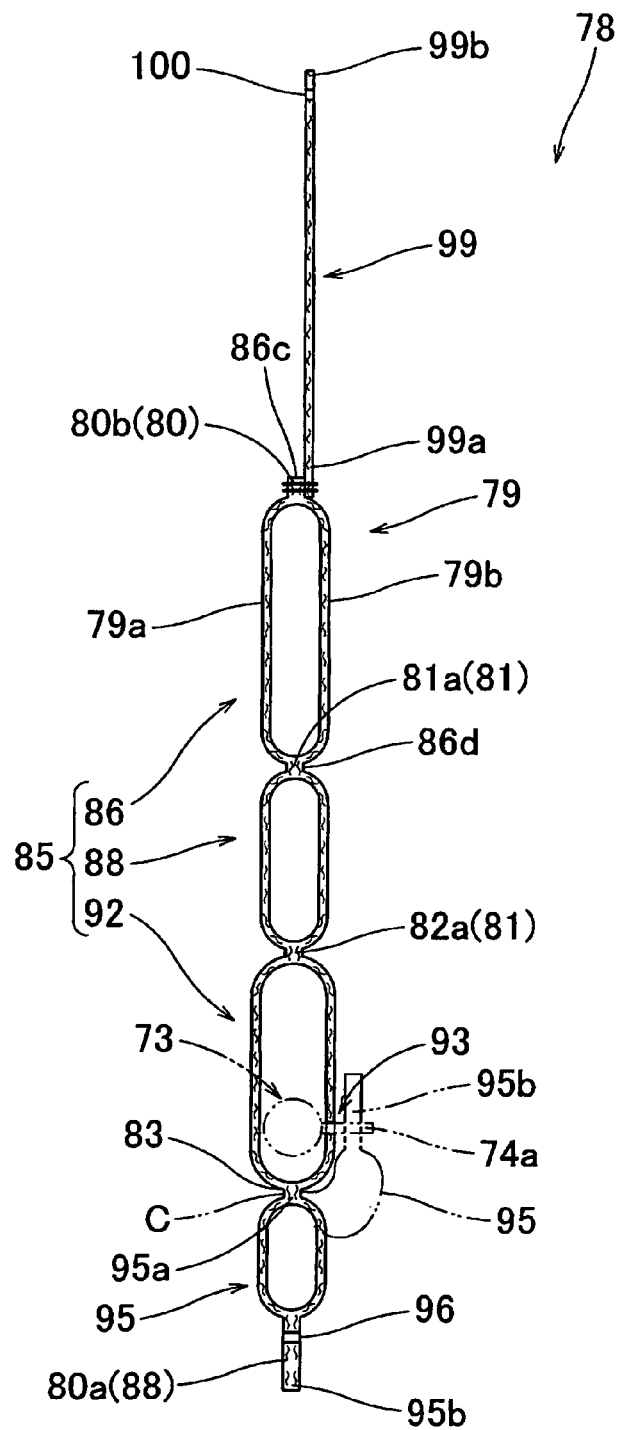
FIG. 19 is a vertical sectional view of the air bag in FIG. 18, the view showing a portion taken along the line XIX-XIX in FIG. 18.

As is shown in FIGS. 18, 19, the air bag 78 has a bag main body 79 that is inflatable when an inflation gas is introduced into an interior thereof. The bag main body 79 is flexible and has a bag-like shape. The bag main body 79 includes an inflatable covering portion 85 and an inflatable supporting portion 95 that is disposed on a lower surface side of the inflatable covering portion 85 when the inflatable supporting portion 95 completes its inflation. In addition, in the case of the embodiment, the air bag 78 has a connecting belt 99 which is separated from the bag main body 79 and which functions as an inner strap portion for connecting the inflatable covering portion 85 to the case portion 70 (the storage portion P2). In FIGS. 18, 19, in the air bag 78 that has deployed flat, an upper side constitutes a left-hand side of the air bag 78 when it is installed in the vehicle. In the air bag 78 that has deployed flat, a lower side constitutes a right-hand side of the air bag 78 when it is installed in the vehicle.

In the case of the embodiment, the bag main body 79 has a vehicle body side wall portion 79b which is disposed on the front pillar side 1 when it completes its inflation and a wall portion facing a vehicle's outer side or outer wall portion 79a which is disposed to confront the vehicle body side wall portion 79b and is configured as a flat bag in which circumferential edges of the vehicle body side wall portion 79b and the outer wall portion 79a which are both deployed flat are connected together. In the case of the embodiment, the bag main body 79 is woven into a bag of polyester fibers or polyamide fibers by means of hollow weave. Specifically, the bag main body 79 has such an external shape that the inflatable covering portion 85 and the inflatable supporting portion 95 are connected together at their lateral sides lying in the left-right direction. In the case of the embodiment, the bag main body 79 is configured as having a substantially inverted L-shape when it deploys flat, which substantially inverted L-shape is made up of a longitudinal area portion 79c which extends in the front-rear direction and a lateral area portion 79d which extends laterally at the front of the longitudinal area portion 79c.

In the bag main body 79, the outer wall portion 79a and the vehicle body side wall portion 79b are connected together along a circumferential edge portion 80 which is formed along the full circumference of an outer circumferential edge thereof and at dividing portions 81, 82, 83 which are formed at predetermined locations within an area surrounded by the circumferential edge portion 80 so that no inflation gas is allowed to flow thereinto. In other remaining areas, the outer wall portion 79a and the vehicle body side wall portion 79b are made separable so that an inflation gas is allowed to flow into an interior of a space defined between the separable wall portions. The dividing portion 81 is disposed within the area of the longitudinal area portion 79c while extending from a rear portion 80c of the circumferential edge portion 80 and has a longitudinal rod portion 81a which extends continuously from the rear portion 80c to thereby be disposed substantially along the front-rear direction and a terminal end portion 81b which is disposed at a front end side of the longitudinal rod portion 81a. The terminal end portion 81b is configured as a substantially circular shape whose width dimension in the left-right direction is made larger than that of the vertical rod portion 81a so as to suppress the occurrence of stress concentration at the time of inflation to an extreme extent. In the case of the embodiment, the dividing portion 81 is formed in a position which lies slightly further rightwards than a center in the left-right direction of the longitudinal area portion 79c. The dividing portion 82 is disposed so as to extend to the front from a boundary portion between the longitudinal area portion 79c and the lateral area portion 79d and has a longitudinal rod portion 82a which extends continuously from the rear portion 80c of the circumferential edge portion 80 to thereby be disposed substantially along the front-rear direction and a terminal end portion 82b which is disposed at a front end side of the longitudinal rod portion 82a. A width dimension in the left-right direction of the terminal end portion 82b is made larger than that of the longitudinal rod portion 82a, and further, the longitudinal rod portion 82a is configured as an oval shape whose longitudinal direction is made to substantially follow the left-right direction so that its width dimension is made larger than the width dimension in the left-right direction of the terminal end portion 81b of the dividing portion 81. This terminal end portion 82b is also formed for the purpose of suppressing the occurrence of stress concentration at the time of inflation to an extreme extent. In the case of the embodiment, the terminal end portion 81b of the dividing portion 81 and the terminal end portion 82b of the dividing portion 82 are disposed in positions which substantially coincide with each other in the left-right direction. The dividing portion 83 is formed as a substantially linear shape which extends in the front-rear direction in proximity to a right end of the lateral area portion 79d. In the case of the embodiment, the dividing portion 83 extends continuously from the rear portion 80c of the circumferential edge portion 80 and is configured as having a space defined between a front end 83a thereof and the circumferential edge portion 80.

When completing its inflation, the inflatable covering portion 85 is disposed so as to cover an area extending from a front area of the outside rearview mirror 27A to the front surface 1a of the front pillar 1. In the case of the embodiment, the inflatable covering portion 85 includes a pillar covering portion 86 which is disposed so as to cover the front surface 1a side of the front pillar when it completes its inflation, a fitting cell portion 88 which is disposed below the pillar covering portion 86 and an inflatable mounting portion 92 which is disposed below the fitting cell portion 88 and is mounted on the case portion 70 with the inflator 73 incorporated therein.

When completing its inflation, the pillar covering portion 86 covers the front surface 1a side of the front pillar 1 over an area extending from a proximal portion 1b which constitutes a lower end side of the front pillar 1 to a portion in proximity to a vertical center of the front pillar 1. In the case of the embodiment, a rear end 86a side of the pillar covering portion 86 is disposed further rearwards than the mirror main body 28A when the pillar covering portion 86 completes its inflation. In the case of the embodiment, the pillar covering portion 86 is made up of an area of the longitudinal portion 79c of the bag main body 79 which lies further leftwards than the dividing portion 81 when the bag main body deploys flat. In other words, the pillar covering portion 86 is surrounded along the periphery thereof by the circumferential edge portion 80 and the dividing portion 81 and is closed relative to the adjacent fitting cell portion 88 on a rear end 86a side thereof when the pillar covering portion 86 completes its inflation, whereby the pillar covering portion 86 communicates with the fitting cell portion 88 only at a front end 86b side thereof when it completes its inflation. To describe this specifically, the pillar covering portion 86 is opened only at an area lying between a front portion 80d of the circumferential edge portion 80 which constitutes the front end 86b side and the terminal end portion 81b of the dividing portion 81. This area functions as an inlet opening 87 from which an inflation gas is allowed to flow into the pillar covering portion 86, and the pillar covering portion 86 communicates with the fitting cell portion 88 and the inflatable mounting portion 92 via the inlet opening 87.

The fitting cell portion 88 is installed so as to cover an area extending from a lateral surface of the front pillar 1 to a lateral surface of the side window 14 below the front pillar 1 at an area lying below the pillar covering portion 86 when the fitting cell portion 88 completes its inflation. The fitting cell portion 88 is designed to fit in a space H2 defined between the mirror main body 28A of the outside rearview mirror 27A and the side window 14 which constitutes a lateral side of the vehicle on an upper surface side of the outside rearview mirror 27A at a rear portion 89 which constitutes a rear end 88a side when the fitting cell portion 88 completes its inflation. Specifically speaking, when the air bag 78 completes its inflation, a lower area 89a of the rear portion 89 of the fitting cell portion 88 fits in the space H2 defined between the mirror main body 28A and the side window 14 (refer to FIG. 22). In the case of the embodiment, in the longitudinal area portion 79c of the bag main body 79, the fitting cell portion 88 is made up of an area defined between the dividing portions 81, 82 when the bag main body 79 deploys flat. In other words, the fitting cell portion 88 88 is surrounded along the periphery thereof the rear portion 80c of the circumferential edge portion 80 and the dividing portions 81, 82 and has a substantially rod shape which extends substantially along the front-rear direction as a shape resulting when the fitting cell portion 88 completes its inflation. In addition, the fitting cell portion 88 is connected to the pillar covering portion 86 via the dividing portion 81. In other words, in such a state that the fitting cell portion 88 is separated from the pillar covering portion 86 with a rear end 88a side closed relative to the pillar covering portion 86, the fitting cell portion 88 is connected to a right edge 86d of the pillar covering portion 86, which is deploying flat, over the whole area in the front-rear direction thereof. In the case of the embodiment, a length dimension in the front-rear direction of the fitting cell portion 88 is made slightly smaller than a length dimension in the front-rear direction of the pillar covering portion 86. When the air bag 78 completes its inflation, the rear end 88a side of the fitting cell portion 88 is made to project further rearwards than a proximal portion 28a of the mirror main body 28A (refer to FIG. 23), and when the air bag 78 completes its inflation, the fitting cell portion 88 is made to support a lower side of the pillar covering portion 86 over substantially the whole area in the front-rear direction thereof.

The fitting cell portion 88 is also closed relative to the inflatable mounting portion 92 which is disposed below the fitting cell portion 88 at the rear end 88a side. Namely, the fitting cell portion 88 communicates with the adjacent pillar covering portion 86 and inflatable mounting portion 92 only at a front end 88b side portion. Specifically speaking, the fitting cell portion 88 communicates with the inflatable mounting portion 92 at the front end 88b side via the area defined between the terminal end portion 82b of the dividing portion 82 which constitutes the inflatable mounting portion 92 and the front portion 80d of the circumferential edge portion 80 which functions as an inlet opening from which an inflation gas is allowed to flow into an interior of the fitting cell portion 88. As has been described above, the fitting cell portion 88 communicates with the pillar covering portion 86 at the location of the inlet opening 87 which is disposed thereabove when the fitting cell portion 88 inflates. A length dimension in the front-rear direction of the fitting cell portion 88 is set to such a length dimension that when the air bag 78 completes its inflation, a portion in proximity to the rear end 88a (in the case of the embodiment, the lower area 89a of the rear portion 89) can fit in the space H2 defined between the mirror main body 28A and the side window 14. In the case of the embodiment, the length dimension of the fitting cell portion 88 is set to a length dimension which is slightly smaller than the width dimension in the front-rear direction of the pillar covering portion 86 so that when the fitting cell portion 88 completes its inflation, the rear end 88a is positioned further forwards than the rear end 86a of the pillar covering portion 86 and the front end 88b substantially coincides with the front 86b of the pillar covering portion 86.

A width dimension in the front-rear direction of the inflatable mounting portion 92 is made smaller than the width dimension in the front-rear direction of the fitting cell portion 88 so as to cover an area on the outside rearview mirror 27A which lies at the front side of the mirror main body 28A on a lateral surface side at an upper end (a belt line 17) of the door portion 18 of the front side door 13. In the lateral area portion 79d of the bag main body 79, the inflatable mounting portion 92 is made up of an area defined between the dividing portions 82, 83 when the bag main body 79 deploys flat. The inflatable mounting portion 92 is closed at a rear end 92a side when it completes its inflation relative to the fitting cell portion 88 and the inflatable supporting portion 95 by the dividing portions 82, 83 which are both disposed on the periphery thereof. The inflatable mounting portion 92 is made to communicate with the adjacent fitting cell portion 88 and inflatable supporting portion 95 only at the locations of the inlet opening 90 positioned and a communicating portion 97 which are both positioned at a front end 92b side of the inflatable mounting portion 92. In addition, the inflatable mounting portion 92 incorporates the inflator 73 a portion (a rear portion 93) between the dividing portions 82, 83 which lies in proximity to the rear end 92a. Insertion holes 93a through which the bolts 74a on the inflator 73 are inserted are formed in a portion of the vehicle body side wall portion 79b which constitutes the rear portion 93. In the case of the embodiment, the insertion holes 93a are formed in two locations which lie along the front-rear direction so as to correspond to the bolts 74a on the inflator 73. The inflatable mounting portion 92 is disposed so that portions of the vehicle body side wall portion 79b which lie on the peripheries of the insertion holes 93a are pulled into an interior of the case portion 70 while the remaining portion of the vehicle body side wall portion 79b is caused to project outwards from the opening 70c in the case portion 70.

In the embodiment, when the air bag 78 completes its inflation, the pillar covering portion 86, the fitting cell portion 88 and the inflatable mounting portion 92 are disposed so as to be superposed one on the top of another with the front ends 86b, 88b, 92b thereof caused to substantially coincide in the vertical direction. The fitting cell portion 88 is configured so that an inflation gas is introduced into the interior thereof from the inlet opening 90 disposed on the inflatable mounting portion 92's side where the inflator 73 is incorporated. The pillar covering portion 86 is configured so that the inflation gas which has passed through the inlet opening 90 is introduced further into the interior thereof from the inlet opening 87 disposed at the boundary portion with the fitting cell portion 88. Namely, in the embodiment, the inlet opening 90 from which the inflation gas is introduced into the interior of the fitting cell portion 88 is disposed further upstream of the flow of the inflation gas than the inlet opening 87 from which the inflation gas is introduced into the interior of the pillar covering portion 86.

When the air bag 78 completes its inflation, the inflatable supporting portion 95 is disposed on a lower surface side of the inflatable covering portion 85 so that the inflatable supporting portion 95 is supported on an outer panel 19 of a front side door 13 as a vehicle side member on a side facing the vehicle's inner side or inner side I which constitutes a lower surface side 95c thereof. The inflatable supporting portion 95 supports the lower surface side of the inflatable covering portion 85 (specifically speaking, a lower surface 92c side of the inflatable mounting portion 92) by being supported by the outer panel 19 on the lower surface 95c side (the inner side I)

thereof. In the case of the embodiment, in the lateral area portion 79d of the bag main body 79, the inflatable supporting portion 95 is made up of an area lying further rightwards than the dividing portion 83 when the bag main body portion 79 deploys flat. In the case of the embodiment, when it deploys, the inflatable supporting portion 95 extends from the inflatable mounting portion 92, and a width dimension in the front-rear direction is made to circumferentially coincide with a width dimension in the front-rear direction of the inflatable mounting portion 92. The inflatable supporting portion 95 is connected to the inflatable mounting portion 92 of the inflatable covering portion 85 on a proximal portion 95a side (a left end side in such a state that the bag main body 79 deploys flat) thereof. The inflatable supporting portion 95 is separated by the dividing portion 83 at a boundary portion with the inflatable mounting portion 92. In other words, a portion of the inflatable supporting portion 95 which constitutes a rear end 95d side when it completes its inflation is closed relative to the inflatable mounting portion 92 by the dividing portion 83, whereby the inflatable supporting portion 95 communicates with the inflatable mounting portion 92 only at a communicating portion 97 which is made up of an area defined between a front end 83a of the dividing portion 83 and the front portion 80d of the circumferential edge portion 80.

Figure 20:
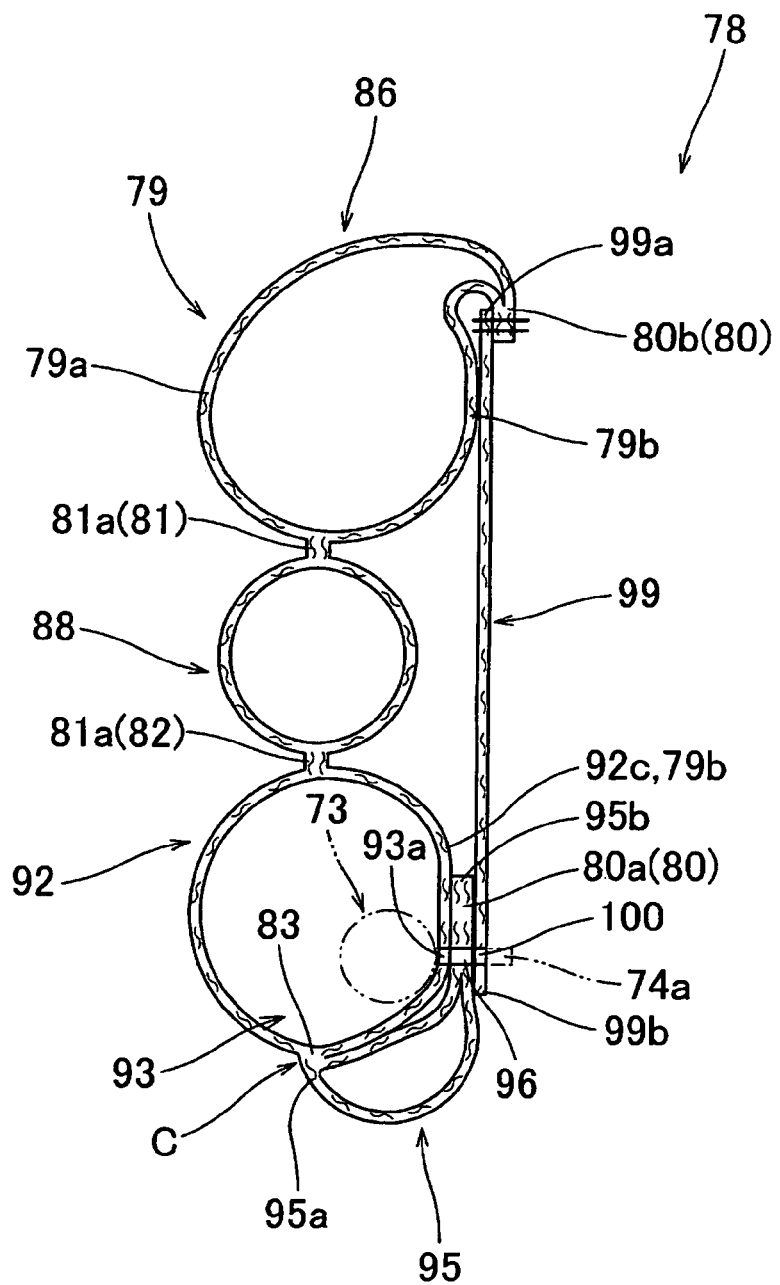
FIG. 20 is a sectional view showing a state in which the air bag in FIG. 18 is inflated alone.

The inflatable supporting portion 95 includes insertion holes 96 through which the bolts 74 of the inflator 73 can be inserted at a right-hand side portion 80a of the circumferential edge portion 80 which constitutes a distal end 95b side (a right end side in such a state that the inflatable supporting portion 95 deploys flat) which lies far apart from the proximal portion 95a. The bolts 74 of the inflator 73 are inserted thereinto (refer to FIGS. 19, 20), and the inflatable supporting portion 95 is mounted on the case portion 70 at circumferential portions on the peripheries of the insertion holes 96 together with the inflator 73 and the inflatable mounting portion 92 of the air bag 78. The insertion holes 96 are formed at two locations lying along the front-rear direction so as to correspond to the bolts 74 of the inflator 73. In the case of the embodiment, a folding line C (refer to FIGS. 18, 19) is provided at the location of the dividing portion 83, and the inflatable supporting portion 95 is folded along the folding line C towards the inflatable mounting portion 92 so that the vehicle body side wall portion 78b at the inflatable mounting portion 95 is brought into contact with the vehicle body side wall portion 78b at the inflatable mounting portion 92, and then, the bolts 74a are inserted through the insertion holes 96.

The inflatable supporting portion 95 is interposed between the outer panel 19 and the inflatable mounting portion 92 so that the vehicle body side wall portion 79b at the inflatable supporting portion 95 is brought into contact with the vehicle body side wall portion 79b which constitutes the inflatable mounting portion 92 (the lower surface 92c) and that the lower surface 95c side which is made up of the outer wall portion 79a is supported on the outer panel 19 of the front side door 13, which constitutes the vehicle body side member, in such a state that the inflatable supporting portion 95 is folded at the location of the folding line C towards the inflatable mounting portion 92 so that the proximal portion 95a side is positioned to face the vehicle's outer side O while the distal end 95b side is positioned to face the vehicle's inner side I which constitutes a side facing the case portion 70 or a case portion 70 side when the air bag 78 completes its inflation. By doing so, the inflatable supporting portion 95 supports the lower surface side 92c of the inflatable mounting portion 92 (refer to FIG. 21).

The connecting belt 99, which functions as the inner strap portion, is separated fro the bag main body 79 and is made of a woven fabric of polyester fibers or polyamide fibers. The connecting belt 99 is stitched to a left-hand side portion 80b of the circumferential edge portion 80 of the bag main body 79, which is deploying flat, at a proximal portion 99a thereof. In other words, the connecting belt 99 is formed so as to extend from a left edge 86c of the pillar covering portion 86 which constitutes a side lying far apart from the fitting cell portion 88 (a side which is positioned far apart from the case portion 70 when the pillar covering portion 86 deploys flat). In the case of the embodiment, the connecting belt 99 is formed as a wide strap which is disposed substantially along the left-right direction, and a width dimension in the front-rear direction there of is made approximately half a width dimension in the front-rear direction of the lateral area portion 79d if the bag main body 79. In addition, insertion holes 100 through which the bolts 74a of the inflator 73 can be inserted are formed at a distal end 99b side of the connecting belt 99. The insertion holes 100 are formed at two locations along the front-rear direction so as to correspond to the bolts 74a of the inflator 73. In this embodiment, a distal end 99b of the connecting belt 99 is connected to the bottom wall portion 70a of the case portion 70 together with the inflator 73, the inflatable mounting portion 92 of the air bag 78 and the distal end 95b of the inflatable supporting portion 95 by making use of the bolts 74a of the inflator 73.

This connecting belt 99 is disposed between the inflatable covering portion 85 and the front pillar 1 when the air bag 78 completes its inflation. A length dimension of the connecting belt 99 is set to such a length dimension that a left edge 86c side of the pillar covering portion 86 is pulled towards the case portion 70 (the storage portion P2) side so as to prevent the left edge 86c of the pillar covering portion 86 from rising from the front pillar 1 and that a quick deployment of the pillar covering portion 89 is not interrupted. In the case of the embodiment, in the insertion holes 100 which are provided at the distal end 99b side of the connecting belt 99, in consideration of the fact that the front pillar 1 is inclined relative to the case portion 70, a spaced-apart distance of the insertion hole 100B which is disposed further rearwards from the insertion hole 93a is made larger than a spaced-apart distance of the insertion hole 100F which is disposed further forwards from the insertion hole 93a. In addition, the distal end 99b of the connecting belt 99 is also inclined relative to the front-rear direction so as to correspond to the insertion holes 100F, 100B (refer to FIG. 18).

In the case of the embodiment, the air bag 78 is folded in such a state that the bolts 74a are caused to project from the insertion holes 93a, that the inflator 73 is incorporated at the rear portion 93 of the inflatable mounting portion 92, that the inflatable supporting portion 95 is folded relative to the inflatable mounting portion 92 so that the vehicle body side wall portion 79b thereat confronts the vehicle body side wall portion 79b at the inflatable mounting portion 92, and that the bolts 74a are inserted through the insertion holes 96 formed at the right-hand side portion 80a of the circumferential edge portion 80 (the distal end 95b of the inflatable supporting portion 95). Then, the bag main body 79, which is so folded, is stored within the case portion 70 together with the inflator 73 in such a state that the bolts 74a are inserted through the insertion holes 100 formed at the distal end 99b of the connecting belt 99. Then, by tightening nuts 75 on the bolts 74a which project from the bottom wall portion 70a of the case portion 70 at the outer reinforcement 20 of the front side door 13, the end portion at the distal end 95b side of the inflatable supporting portion 95 (the right-hand side portion 80a of the circumferential edge portion 80) and the distal end 99b of the connecting belt 99 can be attached to the case portion 70 at the same time as the inflator 73 and the air bag 78 can be mounted in the case portion 70.

Figure 22:
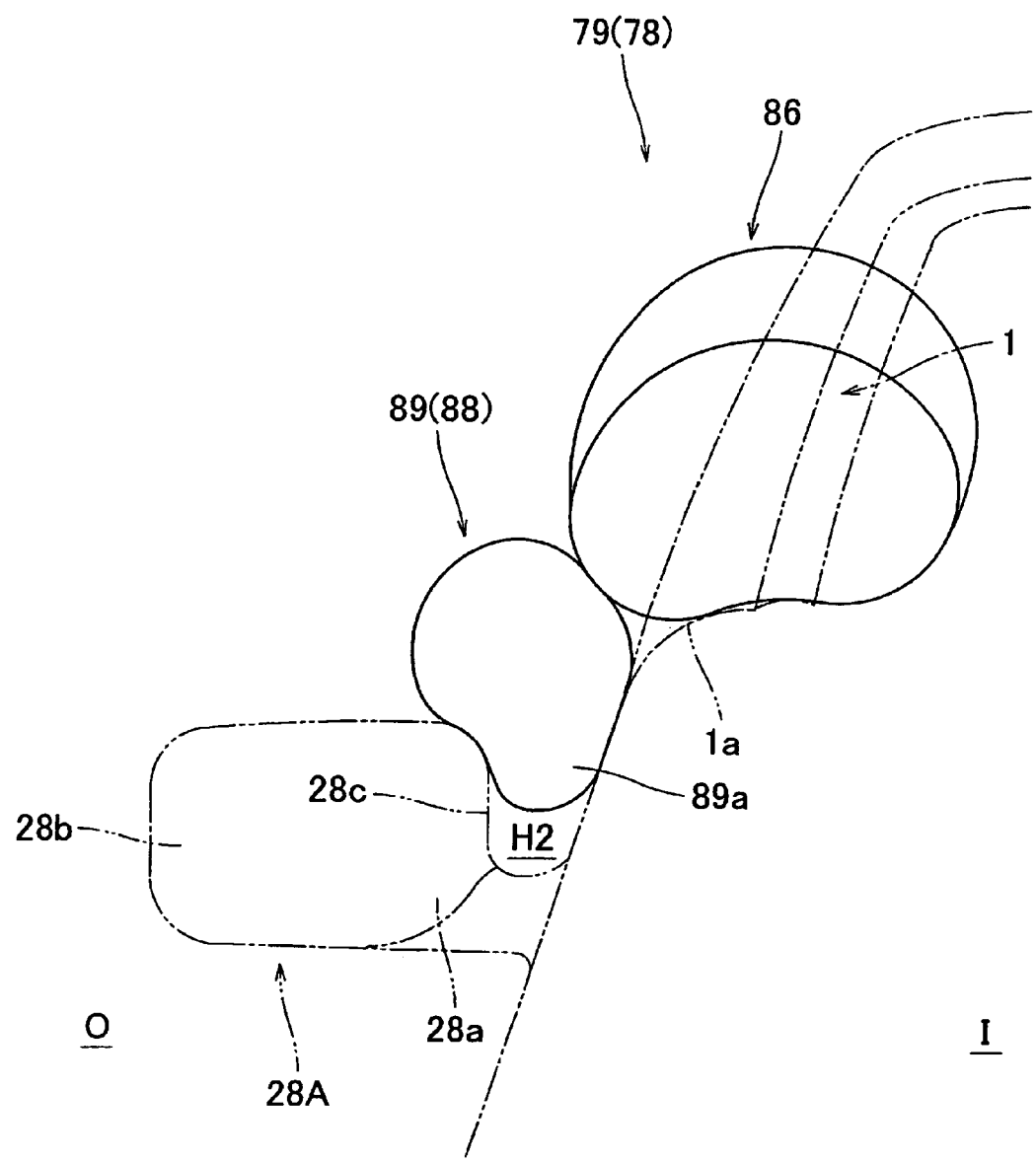
FIG. 22 is a schematic view showing a state in which a fitting cell portion is fitted in a space between an outside rearview mirror and a front side window when the air bag system of the second embodiment is activated.
Figure 23:
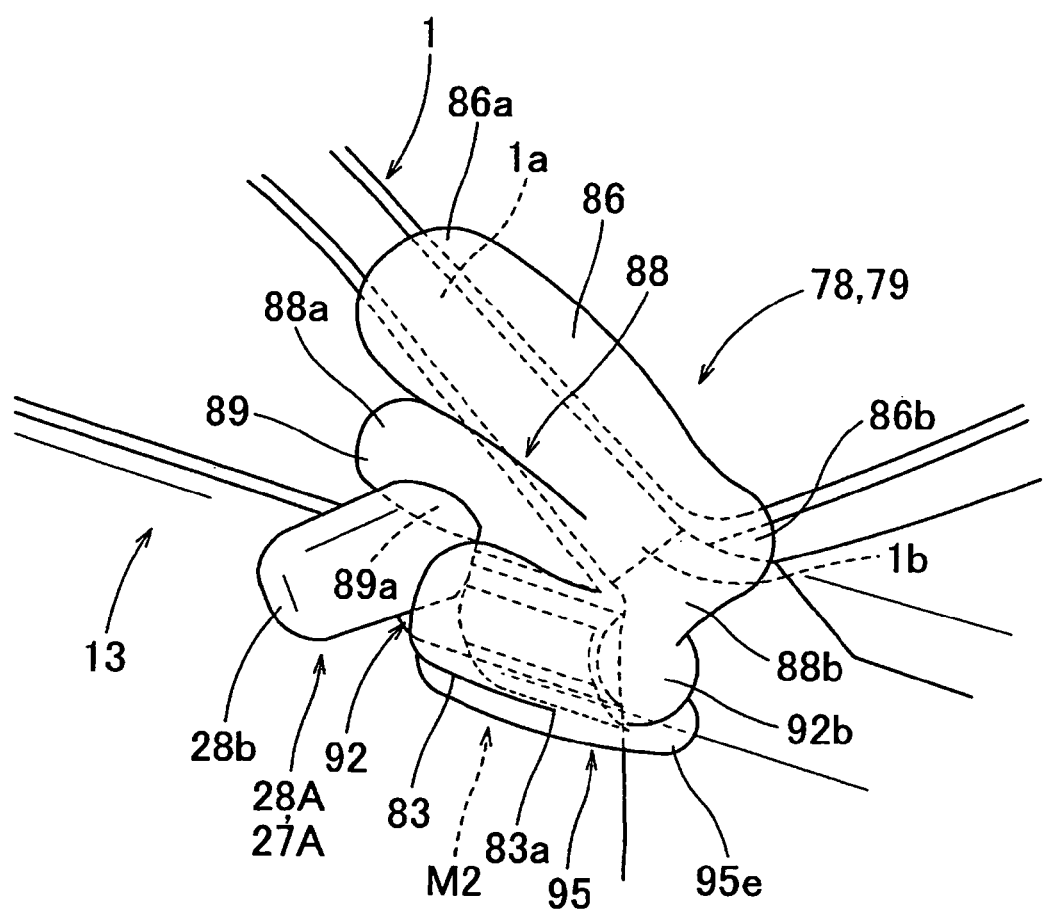
FIG. 23 is a schematic perspective view showing a state in which the air bag completes it inflation when the air bag system of the second embodiment is activated.

Also, in the air bag system M2 of the second embodiment, in the event that the inflator 73 is activated after the air bag system M2 is installed in the vehicle V, an inflation gas discharged from the inflator 73 flows into the air bag 78, the air bag 78, which is inflating, push opens an air bag cover 71, and the air bag 78, which projects from the opening 70c in the case portion 70 completes its inflation as indicated by chain double-dashed lines in FIGS. 14 to 16 and shown in FIGS. 21 to 23.

In addition, also, in the air bag system M2 of the second embodiment, the air bag 78 has the fitting cell portion 88, which is separated from the pillar covering portion 86 which covers the front surface 1a of the front pillar 1 and which is disposed to fit in the space between the mirror main body 28A of the outside rearview mirror 27A and the side window 14, which constitutes the side surface of the vehicle, (the space H2 defined between the left end face 28c of the mirror main body 28A and the side window 14) at the rear portion 89 which constitutes the rear end 88a side on the upper surface side of the outside rearview mirror 27 below the pillar covering portion 86 as shown in FIGS. 22, 23 when the fitting cell portion 88 completes its inflation. Therefore, when the air bag 78 completes its inflation, the fitting cell portion 88 is fastened stably on either of sides in the left-right direction (an inside-outside direction) thereof by the mirror main body 28A of the outside rearview mirror 27 or the side window 14, whereby a deflection towards the left-right direction (the vehicle's inside-outside direction) is suppressed to an extreme extent. In the case of the embodiment, the fitting cell portion 88 fits in the space H2 defined between the mirror main body 28A and the side window 14 at a lower area 89a of the rear portion 89 (refer to FIG. 22).

The fitting cell portion 88 is connected to a lower edge side of the pillar covering portion 86 (the right edge 86d of the pillar covering portion 86 when it deploys flat) over substantially the whole area thereof along the front-rear direction by the dividing portion 81. Because of this, also, in the air bag system M2 of the second embodiment, the side facing the vehicle's outer side of the pillar covering portion 86 which is now covering the front surface 1a of the front pillar 1 can be supported by the fitting cell portion 88 whose deflection in the vehicle's inside-outside direction is suppressed by the lower area 89a of the rear portion 89 being fitted in the space H2 defined between the mirror main body 28A of the outside rearview mirror 27 and the side window 14 when the air bag 78 completes its inflation. Thus, even in the event that the pillar covering portion 86 is pressed strongly by a pedestrian when the pillar covering portion 86 receives the pedestrian, the pillar covering portion 86 can be prevented from being shifted largely laterally towards the vehicle's outer side.

Consequently, also, in the air bag system M2 of the second embodiment, the lateral shifting of the pillar covering portion 86 can be suppressed accurately which would otherwise occur when the pillar covering portion 86 receives a pedestrian when the air bag 78 completes its inflation, whereby the front surface 1a of the front pillar 1 can be covered properly.

In the air bag system M2 of the second embodiment, the fitting cell portion 88 takes the substantially rod-like shape which extends substantially along the front-rear direction when it completes its inflation, and the inlet opening 90 through which the inflation gas is allowed to flow into the fitting cell portion 88 is positioned upstream of the pillar covering portion 86 (specifically describing, upstream of the inlet opening 87 through which the inflation gas is allowed to flow into the pillar covering portion 86) at the front end 88b side. Because of this, the fitting cell portion 88 inflates before the pillar covering portion 86 does to thereby fit in the predetermined space H2, whereby the pillar covering portion 86, which is inflating now, can be restrained from deploying while being shifted towards the vehicle's outer side and can then be disposed to cover the front surface 1a side of the front pillar 1 accurately. As this occurs, since the inflation gas flows into the fitting cell portion 88 from the front end 88b side towards the rear end 88a side by way of the inlet opening 90, the fitting cell portion 88 inflates to project towards the space H2 defined between the left end face 28c of the mirror main body 28A and the side window 14, whereby even before the pillar covering portion 86 completes its inflation, the rear end portion 89 of the fitting cell portion 88 is allowed to fit in the space H2 defined between the left end face 28c of the mirror main body 28A and the side window 14 in an ensured fashion. In addition, the fitting cell portion 88 takes the rod-like shape which extends substantially along the front-rear direction when it completes its inflation, and the length dimension in the front-rear direction of the fitting cell portion 88 is made slightly smaller than the length dimension in the front-rear direction of the pillar covering portion 86. In addition, the fitting cell portion 88 is connected to the pillar covering portion 86 over the whole area thereof in the front-rear direction. Therefore, when completing its inflation, the fitting cell portion 88 can support the side facing the vehicle's outer side of the pillar covering portion over substantially the whole area thereof, whereby the pillar covering portion 86 can be prevented accurately from being shifted largely laterally towards the vehicle's outer side. In particular, in the air bag system M2 of the second embodiment, the fitting cell portion 88 projects further rearwards than the proximal portion 28a of the mirror main body 28A at the rear end 88a side when the air bag 78 completes its inflation (refer to FIG. 23) and is then allowed to fit in the space H2 defined between the left end face 28c of the mirror main body 28A and the side window 14 in such a way as to fit therein from thereabove. Because of this, even in case the pillar covering portion 86 is deflected in the vehicle's inside-outside direction, the fitting condition of the fitting cell portion 88 in the space H2 can be held strongly. Then, even in case a pedestrian is brought into forcible contact with the pillar covering portion 86 which has not yet completed its inflation, the positional shifting of the pillar covering portion 86 can be suppressed to an extreme extent by the fitting cell portion 88, thereby making it possible to protect smoothly the pedestrian by the pillar covering portion 86.

Further, in the air bag system M2 of the second embodiment, the fitting cell portion 88 communicates with the pillar covering portion 86 only at the location of the inlet opening 90 at the front end 88b side and is separated from the pillar covering portion 86 at the location of the rear end 88a side where the fitting cell portion 88 is closed relative to the pillar covering portion 86 by the dividing portion 81. Therefore, the lower area 89a of the rear portion 89 of the fitting cell portion 88 which fits in the space H2 defined between the mirror main body 28A and the side window 14 is allowed to fit in the space H2 in such a state that the movement of the inflation gas into the pillar covering portion 86 is suppressed to an extreme extent. Because of this, the fitting condition of the rear portion 89 of the fitting cell portion 88 in the space H2 becomes easy to be held, and the fitting cell portion 88 can support the pillar covering portion 86 while maintaining a high internal pressure, whereby even in case the pillar covering portion 86 which receives a pedestrian is pressed strongly by the pedestrian, the fitting cell portion 88 can receive the pressing force to thereby prevent a lateral shift towards the vehicle's outer side, any lateral shifting of the pillar covering portion 86 towards the vehicle's outer side can be prevented accurately.

Figure 24:
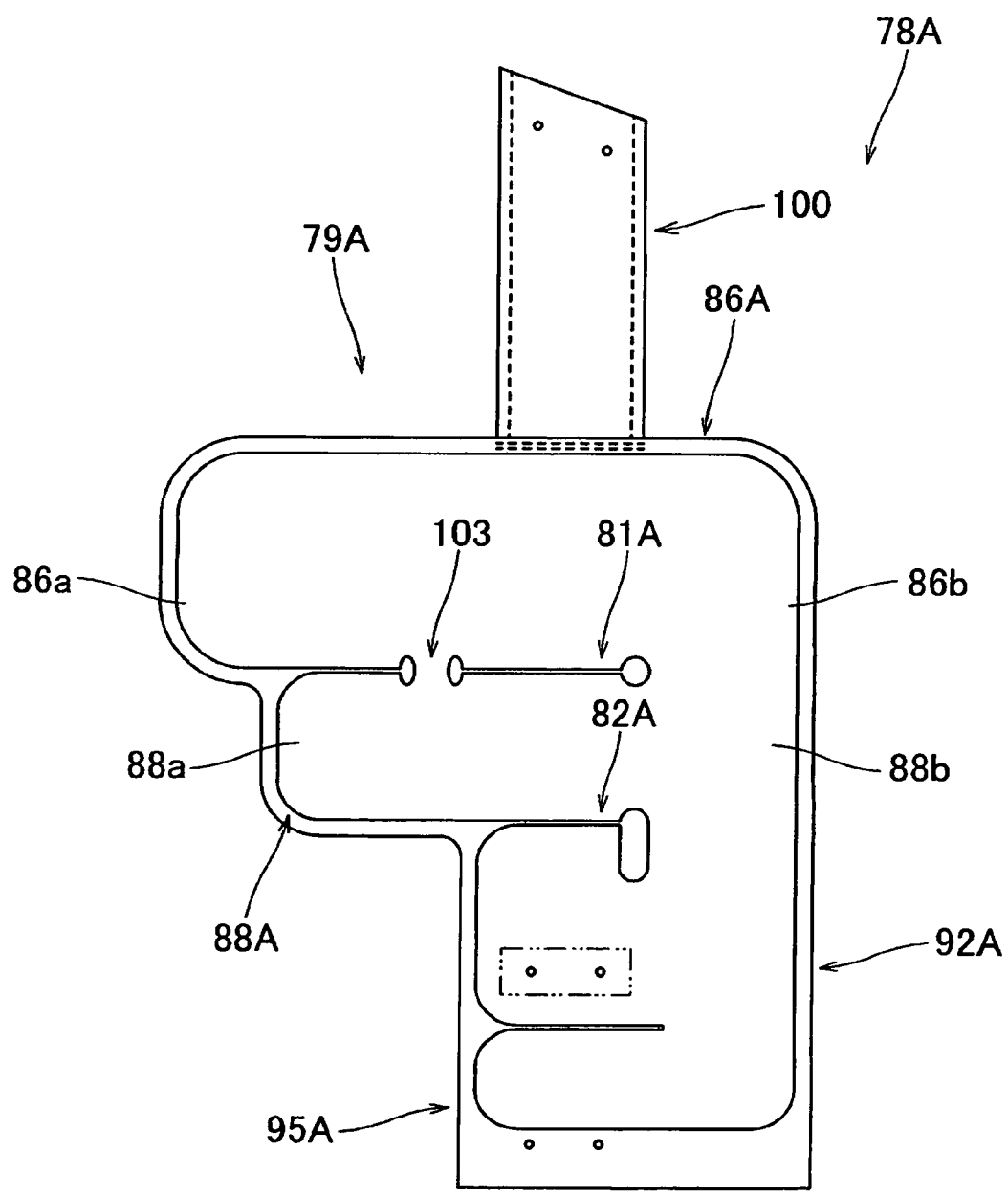
FIG. 24 is a plan view showing a state which an air bag is deployed flat which takes another form capable of being used in the air bag system of the second embodiment.

In contrast, an air bag 78A shown in FIG. 24 may be used which includes a communicating portion 103 is provided in proximity to a rear end 88a of a fitting cell portion 88A for communication between the fitting cell portion 88A and a pillar covering portion 86A. In this air bag 78A, the communicating portion 103 is formed by dividing a dividing portion 81A which separates the fitting cell portion 88A from the pillar covering portion 86A. By using the air bag 78A configured as described above, although the function described above cannot be obtained, since the fitting cell portion 88A enables a two-way flow of inflation gas between the pillar covering portion 86A and itself via the communicating portion 103, excessive inflation gas within the pillar covering portion 86A is allowed to escape into the fitting cell portion 88A when the pillar covering portion 86A receives a pedestrian, thereby making it possible to receive the pedestrian softly by the pillar covering portion 86A.

In addition, in the air bag system M2 of the second embodiment, the air bag 78 includes the inflatable supporting portion 95 which supports the lower surface side of the inflatable covering portion 85 (specifically speaking, the lower surface 92c of the inflatable mounting portion 92). The inflatable supporting portion 95 supports the lower surface 92c side of the inflatable mounting portion 92 by the lower surface 95c side of the inflatable supporting portion 95 being supported on the outer panel 19 of the front side door 13 which is the vehicle body side member which is positioned below the case portion 70 functioning as the storage portion P2b (refer to FIG. 21). Because of this, when it completes its inflation, the whole of the air bag 78 (the bag main body 79) is allowed to be supported by the inflatable supporting portion 95 which is supported by the outer panel 19 on the lower surface 95c side thereof, whereby since a descending movement of the fitting cell portion 88 itself is prevented, the lateral shifting of the pillar covering portion 86 towards the vehicle's outer side can be prevented more accurately.

In particular, in the air bag system M2 of the second embodiment, since when it completes its inflation, the inflatable supporting portion 95 is folded relative to the inflatable mounting portion 92 so as to be interposed between the outer panel 19, which is the vehicle body side member, and the inflatable mounting portion 92 so that the vehicle body side wall portion 79b at the inflatable supporting portion 95 which faces the inflatable mounting portion 92 is brought into contact with the vehicle body side wall portion 79b at the inflatable mounting portion 92, the inflatable supporting portion 95 is disposed so as to support the lower surface 92c side of the inflatable mounting portion 92 in such a state that the two-way flow of the inflation gas between the inflatable supporting portion 95 and the inflatable mounting portion 92 is suppressed. Because of this, since the inflatable supporting portion 95 can support the inflatable covering portion 85 while a high internal pressure is maintained, even in case the pillar covering portion 86 of the inflatable covering portion 85 is pressed strongly by a pedestrian when the pillar covering portion 86 receives the pedestrian, the inflatable supporting portion 95 receives the pressing force exerted on the pillar covering portion 86 by the pedestrian so as to prevent the lateral shifting of the pillar covering portion 86 towards the vehicle's outer side. Thus, the lateral shifting of the pillar covering portion 86 towards the vehicle's outer side can be prevented more accurately.

Specifically speaking, in the air bag system M2 of the second embodiment, the fitting cell portion 88 and the inflatable mounting portion 92, which are disposed below the pillar covering portion 86 when they complete their inflation, are configured so that their front ends 88b, 92b substantially coincide with the front end 86b of the pillar covering portion 86 in the vertical direction. In other words, the inflatable covering portion 85 does not include a recess portion below the pillar covering portion 86 where the front edge side of the inflatable covering portion 85 is partially recessed relative to the pillar covering portion 86. Therefore, the front end 86b of the pillar covering portion 86 itself can be prevented from being deflected relative to the fitting cell portion 88 and the inflatable mounting portion 92. In addition, the width dimension in the front-rear direction of the inflatable supporting portion 95 when it completes its inflation is set to be the same as that of the inflatable mounting portion 92. Therefore, the lower surface 92 side of the inflatable mounting portion 92 can be supported over the whole area thereof which extends in the front-rear direction by the inflatable supporting portion 95. Because of this, the pillar covering portion 86 is supported by the inflatable supporting portion 95 via the inflatable mounting portion 92 which is supported over the whole area thereof which extends in the front-rear direction on the lower surface 92 side by the inflatable supporting portion 95. Therefore, the lateral shifting of the pillar covering portion 86 towards the vehicle's outer side can be prevented accurately.

In the air bag system M2 of the second embodiment, the pillar covering portion 86, the fitting cell portion 88 and the inflatable mounting portion 92 communicate with one another only at the portions lying at their front ends 86b, 88b, 92b sides, and these portions lying at the front ends 86b, 88b, 92b sides are formed into a rod-like shape which extends in the vertical direction when the air bag 78 completes its inflation (refer to FIG. 23). Because of this, there is provided a form in which the portions of the pillar covering portion 86, the fitting cell portion 88 and the inflatable mounting portion 92 which lie at the front ends 86b, 88b, 92b sides, respectively, make up a supporting pillar which extends from the inflatable supporting portion 95 to the pillar covering portion 86. Then, a lower surface side of the front end 86b of the pillar covering portion 86 can be supported strongly and rigidly by the supporting pillar portion, thereby making it possible to prevent accurately the lateral shifting of the pillar covering portion 86.

In the air bag system M2 of the second embodiment, the air bag 78 has the connecting belt 99 portion which extends from the left edge 86c (the inner edge) of the pillar covering portion 86 to be connected to the side of the case portion 70 (the storage portion P2) at the distal end 99b side thereof. Therefore, when the air bag 78 deploys and inflates, the left edge 86c side of the pillar covering portion 86 can be prevented from rising largely from the vehicle body (the windshield 7), thereby making it possible to cover the front surface 1a side of the front pillar 1 quickly by the inflating pillar covering portion 86. In addition, even when receiving a pedestrian, the pillar covering portion 86 can receive the pressing force exerted by the pedestrian so received to thereby be prevented from moving to be shifted from the front pillar 1. Therefore, the pedestrian can accurately be received by the pillar covering portion 86.

In the air bags 42, 78, 78A of the embodiments, while the length dimensions in the front-rear direction of the fitting cell portions 50, 88, 88A are set smaller than those of the pillar covering portions 47, 86, 86A so that when they complete their inflation, the fitting cell portions 50, 88, 88A have the shape in which the rear ends 50a, 80a thereof are positioned further forwards than the rear ends 47a, 86a of the pillar covering portions 47, 86, 86A. However, the external shape of the air bag is not limited thereto, and hence, a configuration may be adopted in which the length dimension in the front-rear direction of the fitting cell portion coincides with the length dimension in the front-rear direction of the pillar covering portion.

In the embodiments, while the air bag systems M1, M2 are installed in the location of the mounting bases 29, 29A of the outside rearview mirrors 27, 27A, the installing position of the air bag systems is not limited thereto, and hence, the air bag systems may be installed in a portion of the front side door which is situated in proximity to the front side of the outside rearview mirror or a portion of the vehicle body which is situated in proximity to the front side of the outside rearview mirror at the front of the front side door.

What is claimed is:

1. An air bag system comprising an air bag which can cover a front surface side of an area of a front pillar of a vehicle which extends from a proximal portion at a lower end side towards a distal end of the front pillar, wherein the vehicle comprises a front side door having a side window which is installed adjacent to a rear side of the front pillar so as to be positioned at a rear of the front pillar and an outside rearview mirror which is positioned in proximity to a front lower corner of the side window, wherein the air bag is folded to be stored within a storage portion disposed in proximity to a front side of the outside rearview mirror, below the front pillar and is designed to be inflated while projecting outwards from the storage portion by allowing an inflation gas to be introduced into an interior of the air bag, the air bag comprising:

a pillar covering portion disposed so as to cover the front surface side of the front pillar when the air bag completes its inflation; and a fitting cell portion which is defined to be separated from the pillar covering portion, which is disposed below the pillar covering portion when the air bag completes its inflation and of which a rear end side portion is fitted into a space defined between a portion of the outside rear view mirror on an upper surface side thereof and a lateral side of the vehicle, and wherein the fitting cell portion is connected to a lower edge side of the pillar covering portion over a substantially whole area thereof along a front-rear direction.

2. The air bag system as set forth in claim 1, wherein the pillar covering portion is positioned further upstream of the inflation gas which flows into the air bag than the fitting cell portion.

3. The air bag system as set forth in claim 2, wherein the fitting cell portion has an inlet opening into which the inflation gas is allowed to flow at a front end side thereof, wherein an inner tube adapted to guide the inflation gas discharged from an inflator for supplying the inflation gas into the air bag towards the side of the pillar covering portion is disposed in the interior of the air bag, and wherein the inner tube has a substantially cylindrical shape and extends across the inlet opening so as to be opened towards the side of the pillar covering portion at a distal end side thereof.

4. The air bag system as set forth in claim 1, wherein the air bag comprises a tether which extends from a circumferential edge of the air bag which completes its inflation to thereby be attached to the side of the storage portion at a distal end thereof, and wherein the tether comprises an inner strap portion which extends from an inner edge side of the pillar covering portion when the pillar covering portion completes its inflation which the inner edge side constitutes a side lying far from the fitting cell portion.

5. The air bag system as set forth in claim 1, wherein the fitting cell portion takes a substantially rod-like shape which extends substantially along the front-rear direction when the fitting cell portion completes its inflation and has at a front end side an inlet opening which is positioned further upstream than the pillar covering portion and through which the inflation gas is allowed to flow into the fitting cell portion.

6. The air bag system as set forth in claim 5, wherein the fitting cell portion is separated from the pillar covering portion with a rear end side closed relative to the pillar covering portion.

7. The air bag system as set forth in claim 5, wherein the fitting cell portion has a communicating portion that is caused to communicate with the pillar covering portion in proximity to a rear end thereof.

8. The air bag system as set forth in claim 5, wherein the air bag comprises:

an inflatable covering portion having the pillar covering portion and the fitting cell portion which are installed therein and disposed so as to cover an area extending from an area at the front side of the outside rearview mirror below the front pillar to the front surface of the front pillar when the inflatable covering portion completes its inflation; and an inflatable supporting portion disposed in the area at the front of the outside rearview mirror and disposed so as to be supported on a lower surface side thereof by a vehicle body side member positioned below the storage portion on the lower surface side of the inflatable covering portion to support the lower surface side of the inflatable covering portion when the inflatable covering portion completes its inflation.

* * * * *